US012651144B2

(12) United States Patent
Liu et al.

(10) Patent No.: US 12,651,144 B2
(45) Date of Patent: Jun. 9, 2026

(54) DETECTION OF ADVERSARIAL EXAMPLE INPUT TO MACHINE LEARNING MODELS

(71) Applicant: Dell Products L.P., Round Rock, TX (US)

(72) Inventors: Jinpeng Liu, Shanghai (CN); Zijia Wang, WeiFang (CN); Zhen Jia, Shanghai (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 925 days.

(21) Appl. No.: 17/954,536

(22) Filed: Sep. 28, 2022

(65) Prior Publication Data

US 2024/0104349 A1     Mar. 28, 2024

(51) Int. Cl.
*G06N 3/045* (2023.01)
*G06N 3/088* (2023.01)
(52) U.S. Cl.
CPC ............. *G06N 3/045* (2023.01); *G06N 3/088* (2013.01)
(58) Field of Classification Search
CPC ........ G06N 3/045; G06N 3/047; G06N 3/084; G06N 3/088; G06N 7/01
See application file for complete search history.

(56) References Cited

U.S. PATENT DOCUMENTS

| | | | | |
|---|---|---|---|---|
| 2021/0125005 A1* | 4/2021 | Kuta | ................... | H04L 63/1416 |
| 2022/0114255 A1* | 4/2022 | Kellermann | ....... | G06V 10/7747 |
| 2022/0269556 A1* | 8/2022 | Henry | ..................... | G06F 9/541 |
| 2022/0382833 A1* | 12/2022 | Riddle | .................. | G06F 17/18 |

OTHER PUBLICATIONS

Meng et al., "MagNet: a Two-Pronged Defense against Adversarial Examples", Nov. 3, 2017, CCS '17, pp. 135-147. (Year: 2017).*
Ghosh et al., "Resisting Adversarial Attacks Using Gaussian Mixture Variational Autoencoders", Dec. 10, 2018, arXiv:1806.00081v2 , pp. 1-8. (Year: 2018).*
Choi et al. (Choi et al., "Clustering Approach for Detecting Multiple Types of Adversarial Examples", May 18, 2022, Sensors 2022, 22, pp. 1-18, hereinafter "Choi"). (Year: 2022).*
Y. Li et al., "A Review of Adversarial Attack and Defense for Classification Methods," The American Statistician, Jan. 4, 2022, 17 pages.

(Continued)

*Primary Examiner* — Brent Johnston Hoover
(74) *Attorney, Agent, or Firm* — Ryan, Mason & Lewis, LLP

(57) ABSTRACT

An apparatus comprises a processing device configured to utilize a first machine learning model to determine a classification output for a given input indicating probability of the given input belonging to each of a set of classes, and to utilize a second machine learning model to determine a clustering output for the given input indicating which of a set of clusters that the given input belongs to, the clusters corresponding to respective ones of the classes. The processing device is further configured, responsive to determining that the given input represents an adversarial example based at least in part on a comparison of the classification and clustering outputs for the given input, to modify subsequent processing of the given input by additional machine learning models.

20 Claims, 26 Drawing Sheets

200 — UTILIZE A FIRST MACHINE LEARNING MODEL TO DETERMINE A CLASSIFICATION OUTPUT FOR A GIVEN INPUT, THE CLASSIFICATION OUTPUT INDICATING PROBABILITY OF THE GIVEN INPUT BELONGING TO EACH OF A SET OF TWO OR MORE CLASSES

202 — UTILIZE A SECOND MACHINE LEARNING MODEL TO DETERMINE A CLUSTERING OUTPUT FOR THE GIVEN INPUT, THE CLUSTERING OUTPUT INDICATING WHICH OF A SET OF TWO OR MORE CLUSTERS THAT THE GIVEN INPUT BELONGS TO, THE SET OF TWO OR MORE CLUSTERS CORRESPONDING TO RESPECTIVE ONES OF THE TWO OR MORE CLASSES

204 — DETERMINE WHETHER THE GIVEN INPUT REPRESENTS AN ADVERSARIAL EXAMPLE BASED AT LEAST IN PART ON A COMPARISON OF THE CLASSIFICATION OUTPUT FOR THE GIVEN INPUT AND THE CLUSTERING OUTPUT FOR THE GIVEN OUTPUT

206 — MODIFY SUBSEQUENT PROCESSING OF THE GIVEN INPUT BY ONE OR MORE ADDITIONAL MACHINE LEARNING MODELS RESPONSIVE TO DETERMINING THAT THE GIVEN INPUT REPRESENTS AN ADVERSARIAL EXAMPLE

(56)             References Cited

OTHER PUBLICATIONS

D. Kalaria et al., "Detecting Adversaries, yet Faltering to Noise? Leveraging Conditional Variational AutoEncoders for Adversary Detection in the Presence of Noisy Images," arXiv:2111.15518v2, Dec. 9, 2021, 12 pages.

U. Hwang et al., "PuVAE: A Variational Autoencoder to Purify Adversarial Examples," arXiv:1903.00585v1, Mar. 2, 2019, 7 pages.

N. Papernot et al., "Deep k-Nearest Neighbors: Towards Confident, Interpretable and Robust Deep Learning," arXiv:1803.04765v1, Mar. 13, 2018, 18 pages.

N. Dilokthanakul et al., "Deep Unsupervised Clustering with Gaussian Mixture Variational Autoencoders," arXiv:1611.02648v2, Jan. 13, 2017, 12 pages.

J. Raghuram et al., "A General Framework For Detecting Anomalous Inputs to DNN Classifiers," arXiv:2007.15147v3, Jun. 17, 2021, 27 pages.

N. Papernot et al, "Distillation as a Defense to Adversarial Perturbations against Deep Neural Networks," IEEE Symposium on Security & Privacy, arXiv:1511.04508v2, Mar. 14, 2016, 16 pages.

N. Carlini et al., "Defensive Distillation is Not Robust to Adversarial Examples," arXiv:1607.04311v1, Jul. 14, 2016, 3 pages.

T. Wang et al., "Dataset Distillation," arXiv:1811.10959v3, Feb. 24, 2020, 14 pages.

* cited by examiner

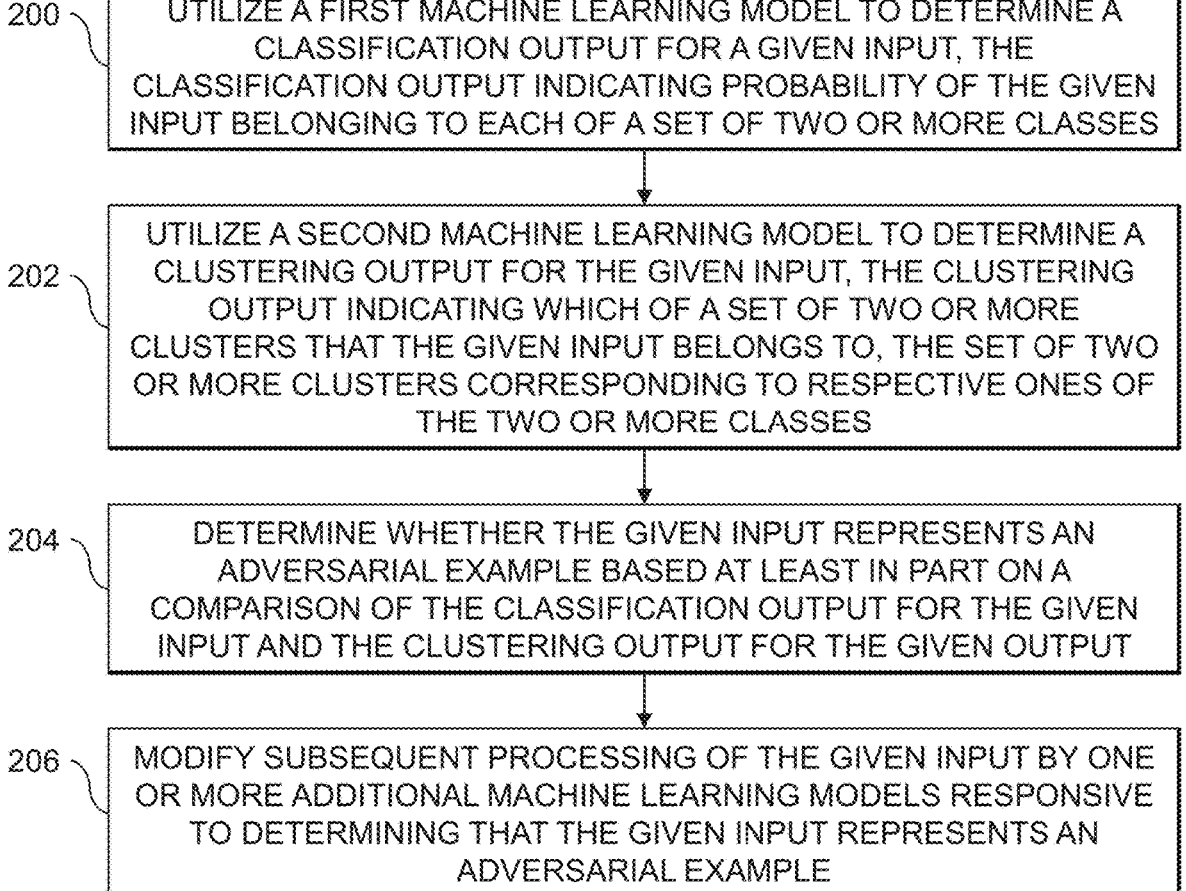

200 — UTILIZE A FIRST MACHINE LEARNING MODEL TO DETERMINE A CLASSIFICATION OUTPUT FOR A GIVEN INPUT, THE CLASSIFICATION OUTPUT INDICATING PROBABILITY OF THE GIVEN INPUT BELONGING TO EACH OF A SET OF TWO OR MORE CLASSES

202 — UTILIZE A SECOND MACHINE LEARNING MODEL TO DETERMINE A CLUSTERING OUTPUT FOR THE GIVEN INPUT, THE CLUSTERING OUTPUT INDICATING WHICH OF A SET OF TWO OR MORE CLUSTERS THAT THE GIVEN INPUT BELONGS TO, THE SET OF TWO OR MORE CLUSTERS CORRESPONDING TO RESPECTIVE ONES OF THE TWO OR MORE CLASSES

204 — DETERMINE WHETHER THE GIVEN INPUT REPRESENTS AN ADVERSARIAL EXAMPLE BASED AT LEAST IN PART ON A COMPARISON OF THE CLASSIFICATION OUTPUT FOR THE GIVEN INPUT AND THE CLUSTERING OUTPUT FOR THE GIVEN OUTPUT

206 — MODIFY SUBSEQUENT PROCESSING OF THE GIVEN INPUT BY ONE OR MORE ADDITIONAL MACHINE LEARNING MODELS RESPONSIVE TO DETERMINING THAT THE GIVEN INPUT REPRESENTS AN ADVERSARIAL EXAMPLE

FIG. 2

PERTURBATIONS
301

ORIGINAL IMAGE
303

ADVERSARIAL EXAMPLE
305

ORIGINAL MODEL
501
PERTURBED MODEL
503
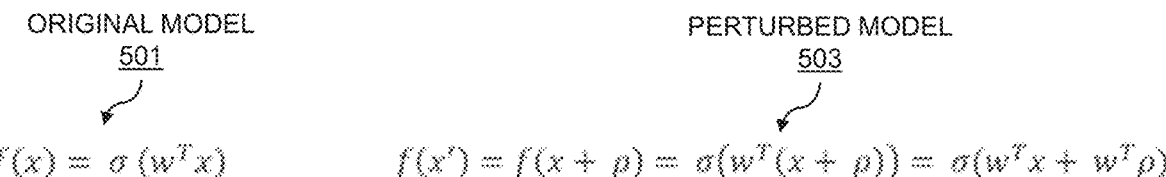
$$f(x) = \sigma(w^T x)$$
$$f(x') = f(x + \rho) = \sigma(w^T(x + \rho)) = \sigma(w^T x + w^T \rho)$$
$y = f(x)\text{PLOT}$
507
DETERMINE
SMALLEST
PERTURBATION
DIRECTION
505
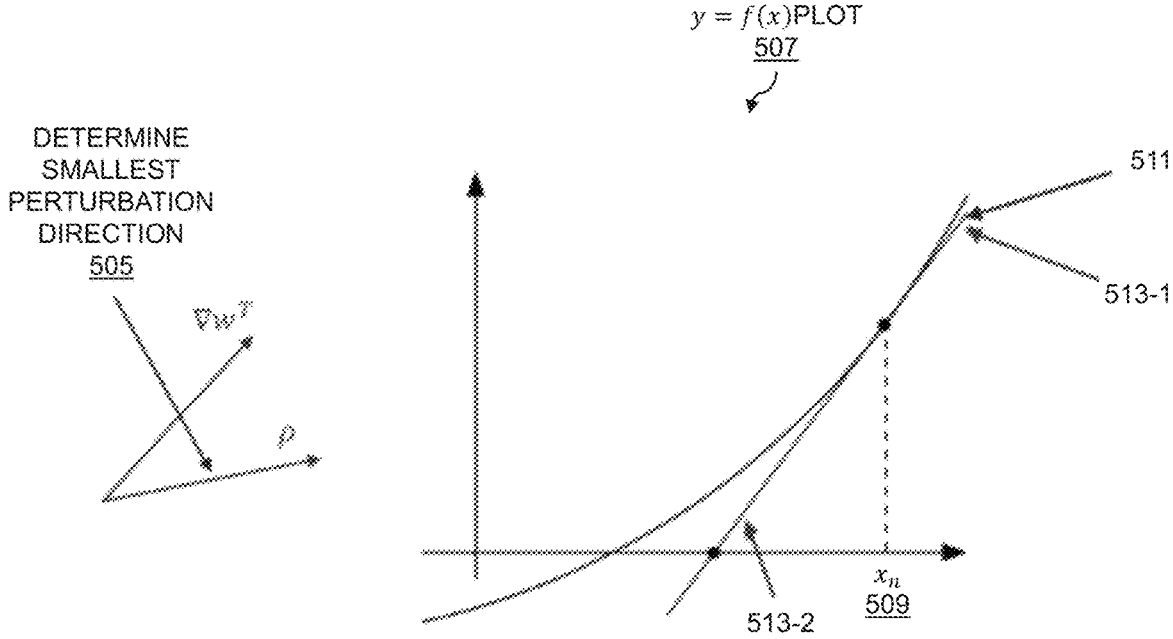
FIG. 5

700

REPRESENTATION SPACE
930

SOFTMAX LAYER
917-4

THIRD HIDDEN
LAYER
917-3

SECOND HIDDEN
LAYER
917-2

FIRST HIDDEN
LAYER
917-1

PANDA

SCHOOL BUS

INPUT
901

+

PERTURBATION
910

=

ADVERSARIAL
EXAMPLE
912

NEAREST NEIGHBORS
940

CONFORMAL          NONCONFORMAL

THIRD HIDDEN LAYER 917-3

SECOND HIDDEN LAYER 917-2

FIRST HIDDEN LAYER 917-1

INPUT
901

PERTURBATION
910

ADVERSARIAL EXAMPLE
912

CLASSIFIER MODEL
ARCHITECTURE
1000

```
def __init__(self, in_dim, n_class):
    super(Cnn, self).__init__()
    self.conv = nn.Sequential()
        nn.Conv2d(in_dim, 6, 5, stride=1, padding=2),
        nn.ReLU(True),
        nn.MaxPool2d(2, 2),
        nn.Conv2d(6, 16, 5, stride=1, padding=0),
        nn.ReLU(True),
        nn.MaxPool2d(2, 2))

self.fc = nn.Sequential(
        nn.Linear(400, 120),
        nn.Linear(120, 84),
        nn.Linear(84, n_class))
```

FIG. 10A

DETECTOR MODEL
ARCHITECTURE
1025

```
# Inference Network
class InferenceNet(nn.Module):
  def __init__(self, x_dim, z_dim, y_dim):
    super(InferenceNet, self).__init__()

# q(y|x)
    self.inference_qyx = torch.nn.ModuleList([
        nn.Linear(x_dim, 512),
        nn.ReLU(),
        nn.Linear(512, 512),
        nn.ReLU(),
        GumbelSoftmax(512, y_dim)
    ])

# q(z|y,x)
    self.inference_qzyx = torch.nn.ModuleList([
        nn.Linear(x_dim + y_dim, 512),
        nn.ReLU(),
        nn.Linear(512, 512),
        nn.ReLU(),
        Gaussian(512, z_dim)
    ])
```

FIG. 10B

DETECTOR MODEL
TRAINING
<u>1050</u>

FIG. 10C

DETECTOR MODEL
EXAMPLE OUTPUT
1100

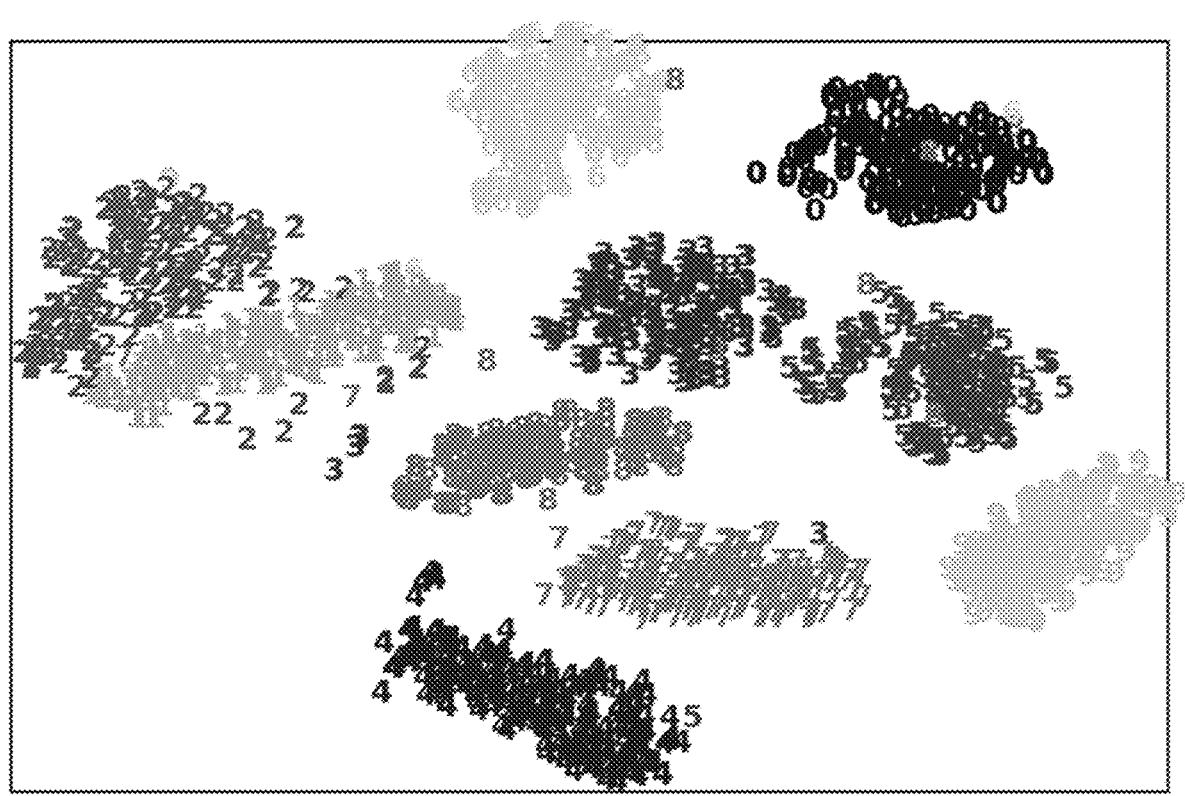
FIG. 12

DETECTOR MODEL
RESULTS
1300

```
1   all_latent=np.load("GMvae_latent_train.npy")
2   all_labels=np.load("GMvae_target_train.npy")
3   from sklearn.neighbors import KNeighborsClassifier
4   def knn(x_train,y_train):
5       knn_clf = KNeighborsClassifier(n_neighbors=4, algorithm='ball_tree')
6       knn_clf.fit(x_train, y_train)
7       return knn_clf
8   Knn=knn(all_latent,all_labels)
9
10  print("knn ready")
11
12  t1=time.time()
13  score=0
14  for i in range(len(features_adver)):
15      KNNpre=knn.predict([features_adver[i]])
16      if KNNpre==labels[i]:
17          score+=1
18  t2=time.time()
19  print("accuracy:",score/len(features_adver)," time:",t2-t1)
``` knn ready
accuracy: 0.8895  time: 13.8353486061096

FIG. 13

DETECTION OF ADVERSARIAL EXAMPLE INPUT TO MACHINE LEARNING MODELS

COPYRIGHT NOTICE

FIELD

The field relates generally to information processing, and more particularly to management of information processing systems.

BACKGROUND

Machine learning models are subject to various attacks, including so-called adversarial example attacks. Adversarial example attacks seek to modify an input to a machine learning model, such that the machine learning model will misclassify the input. An adversarial example attack, for example, may apply some set of perturbations to an image input to produce an adversarial example that appears to the human eye as the original image, but which tricks the machine learning model into classifying the image as something else. Adversarial examples are purposefully crafted inputs that cause the machine learning model to make mistakes.

SUMMARY

Illustrative embodiments of the present disclosure provide techniques for detection of adversarial example input to machine learning models.

In one embodiment, an apparatus comprises at least one processing device comprising a processor coupled to a memory. The at least one processing device is configured to perform the steps of utilizing a first machine learning model to determine a classification output for a given input, the classification output indicating probability of the given input belonging to each of a set of two or more classes, and utilizing a second machine learning model to determine a clustering output for the given input, the clustering output indicating which of a set of two or more clusters that the given input belongs to, the set of two or more clusters corresponding to respective ones of the two or more classes. The at least one processing device is further configured to perform steps of determining whether the given input represents an adversarial example based at least in part on a comparison of the classification output for the given input and the clustering output for the given input and, responsive to determining that the given input represents an adversarial example, modifying subsequent processing of the given input by one or more additional machine learning models.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for detection of adversarial example input to machine learning models in an illustrative embodiment.

FIG. 5 shows a fast gradient sign method for generation of adversarial examples in an illustrative embodiment.

FIGS. 10A-10C show pseudocode for architectures of a classifier and detector models and for training of a detector model in an illustrative embodiment.

FIG. 12 shows a plot of clusters of detector model output in an illustrative embodiment.

FIG. 13 shows pseudocode for determining detector model accuracy results in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
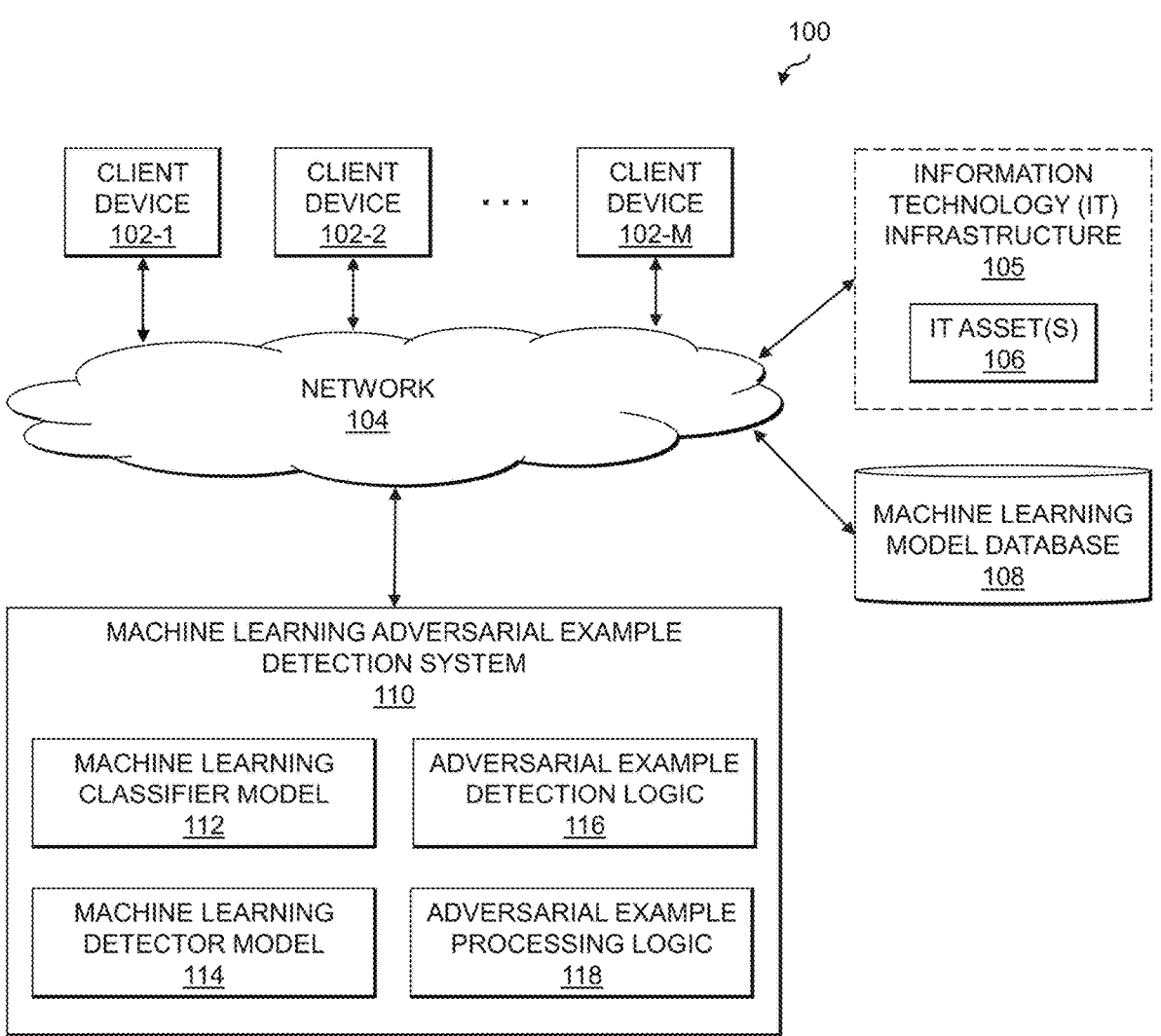
FIG. 1 is a block diagram of an information processing system configured for detection of adversarial example input to machine learning models in an illustrative embodiment.

FIG. 1 shows an information processing system 100 configured in accordance with an illustrative embodiment. The information processing system 100 is assumed to be built on at least one processing platform and provides functionality for detecting adversarial examples for machine learning algorithms. Adversarial examples refer to input that an attacker has designed in order to trick the machine learning algorithms (e.g., which causes the machine learning algorithms to make a mistake, such as misclassifying the input). The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a machine learning model database 108, and a machine learning adversarial example detection system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It is assumed that the client devices 102 and/or IT assets 106 of the IT infrastructure 105 utilize one or more machine learning algorithms as part of such applications. As described in further detail below, the machine learning adversarial example detection system 110 can advantageously be used to detect whether inputs to such machine learning algorithms represent adversarial examples.

In some embodiments, the machine learning adversarial example detection system 110 is used for an enterprise system. For example, an enterprise may subscribe to or otherwise utilize the machine learning adversarial example detection system 110 for detecting whether input to machine learning applications (e.g., running on client devices 102 operated by users of the enterprise, running on the IT assets 106 of the IT infrastructure 105, etc.) represent adversarial examples. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The machine learning model database 108, as discussed above, is configured to store and record various information that is used by the machine learning adversarial example detection system 110 for determining whether input to one or more machine learning applications (e.g., running on the client devices 102, the IT assets 106 of the IT infrastructure 105, etc.) represent adversarial examples. Such information may include, but is not limited to, information regarding configuration of the machine learning classifier and/or detector models (e.g., the machine learning classifier model 112 and machine learning detector model 114), training data for the machine learning classifier and/or detector models, etc. In some embodiments, one or more of the storage systems utilized to implement the machine learning model database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the machine learning adversarial example detection system 110, as well as to support communication between the machine learning adversarial example detection system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes determining whether input to machine learning applications running on the IT assets 106 include adversarial examples). For example, a given one of the client devices 102 may be operated by a user to access a graphical user interface (GUI) provided by the machine learning adversarial example detection system 110 to manage machine learning applications that run on the IT assets 106 of the IT infrastructure 105. The machine learning adversarial example detection system 110 may be provided as a cloud service that is accessible by the given client device 102 to allow the user thereof to manage machine learning applications running on one or more of the IT assets 106 of the IT infrastructure 105. In some embodiments, the IT assets 106 of the IT infrastructure 105 are owned or operated by the same enterprise that operates the machine learning adversarial example detection system 110 (e.g., where an enterprise such as a business provides support for the assets it operates). In other embodiments, the IT assets 106 of the IT infrastructure 105 may be owned or operated by one or more enterprises different than the enterprise which operates the machine learning adversarial example detection system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding machine learning applications (e.g., which run on the client devices 102 and/or the IT assets 106 of the IT infrastructure 105). Such host agents may also or alternatively be configured to automatically receive from the machine learning adversarial example detection system 110 commands or instructions to perform various remedial actions in response to detecting that particular input to one or more of the machine learning applications represent adversarial examples.

It should be noted that a "host agent" as this term is generally used herein may comprise an automated entity, such as a software entity running on a processing device. Accordingly, a host agent need not be a human entity.

The machine learning adversarial example detection system 110 in the FIG. 1 embodiment is assumed to be implemented using at least one processing device. Each such processing device generally comprises at least one processor and an associated memory, and implements one or more functional modules or logic for controlling certain features of the machine learning adversarial example detection system 110. In the FIG. 1 embodiment, the machine learning adversarial example detection system 110 utilizes various information stored in the machine learning model database 108 for instantiating a machine learning classifier model 112 and a machine learning detector model 114. The machine learning classifier model 112 and machine learning detector model 114 illustratively utilize different machine learning algorithm network architectures (e.g., different numbers and/or types of layers, operators, etc.) to ensure that their respective gradients and descending directions are different such that gradient ascending directions found by adversarial attack algorithms against the machine learning classifier model 112 will be ineffective or at least less effective against the machine learning detector model 114.

The machine learning adversarial example detection system 110 is further configured to implement adversarial example detection logic 116, which can provide the same input to both the machine learning classifier model 112 and the machine learning detector model 114 and analyze their respective outputs to determine whether a particular input represents an adversarial example. The machine learning detector model 114 is advantageously separate from the machine learning classifier model 112 rather than co-existing with the machine learning classifier model 112 (e.g., the machine learning detector model 114 is not pre-positioned or post-positioned relative to the machine learning classifier model 112; the machine learning detector model 114 independently receives the same input as the machine learning classifier model 112). The adversarial example processing logic 118 is configured to take action when a particular input is determined to be an adversarial example using the adversarial example detection logic 116. Such action may include, for example, subjecting that input to further scrutiny in a subsequent machine learning pipeline.

It is to be appreciated that the particular arrangement of the client devices 102, the IT infrastructure 105 and the machine learning adversarial example detection system 110 illustrated in the FIG. 1 embodiment is presented by way of example only, and alternative arrangements can be used in other embodiments. As discussed above, for example, the machine learning adversarial example detection system 110 (or portions of components thereof, such as one or more of the machine learning classifier model 112, the machine learning detector model 114, the adversarial example detection logic 116 and the adversarial example processing logic 118) may in some embodiments be implemented internal to one or more of the client devices 102 and/or the IT infrastructure 105.

At least portions of the machine learning classifier model 112, the machine learning detector model 114, the adversarial example detection logic 116 and the adversarial example processing logic 118 may be implemented at least in part in the form of software that is stored in memory and executed by a processor.

The machine learning adversarial example detection system 110 and other portions of the information processing system 100, as will be described in further detail below, may be part of cloud infrastructure.

The machine learning adversarial example detection system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the machine learning model database 108 and the machine learning adversarial example detection system 110 or components thereof (e.g., the machine learning classifier model 112, the machine learning detector model 114, the adversarial example detection logic 116 and the adversarial example processing logic 118) may be implemented on respective distinct processing platforms, although numerous other arrangements are possible. For example, in some embodiments at least portions of the machine learning adversarial example detection system 110 and one or more of the client devices 102, the IT infrastructure 105 and/or the machine learning model database 108 are implemented on the same processing platform. A given client device (e.g., 102-1) can therefore be implemented at least in part within at least one processing platform that implements at least a portion of the machine learning adversarial example detection system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the machine learning model database 108 and the machine learning adversarial example detection system 110, or portions or components thereof, to reside in different data centers. Numerous other distributed implementations are possible. The machine learning adversarial example detection system 110 can also be implemented in a distributed manner across multiple data centers.

Additional examples of processing platforms utilized to implement the machine learning adversarial example detection system 110 and other components of the information processing system 100 in illustrative embodiments will be described in more detail below in conjunction with FIGS. 15 and 16.

It is to be appreciated that these and other features of illustrative embodiments are presented by way of example only, and should not be construed as limiting in any way.

It is to be understood that the particular set of elements shown in FIG. 1 for detection of adversarial examples for machine learning applications is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for detection of adversarial example input to machine learning models will now be described in more detail with reference to the flow diagram of FIG. 2. It is to be understood that this particular process is only an example, and that additional or alternative processes for detection of adversarial example input to machine learning models may be used in other embodiments.

In this embodiment, the process includes steps 200 through 206. These steps are assumed to be performed by the machine learning adversarial example detection system 110 utilizing the machine learning classifier model 112, the machine learning detector model 114, the adversarial example detection logic 116 and the adversarial example processing logic 118. The process begins with step 200, utilizing a first machine learning model to determine a classification output for a given input, the classification output indicating probability of the given input belonging to each of a set of two or more classes. In step 202, a second machine learning model is utilized to determine a clustering output for the given input, the clustering output indicating which of a set of two or more clusters that the given input belongs to, the set of two or more clusters corresponding to respective ones of the two or more classes. The second machine learning model runs independent of the first machine learning model, such as by operating on the given input in parallel.

The first machine learning model may utilize a different neural network architecture than the second machine learning model. The first machine learning model may utilize at least one of different types of hidden layers, different numbers of hidden layers, and different operators than the second machine learning model. A first neural network architecture of the first machine learning model may have a first set of gradients and gradient descending directions, and a second neural network architecture of the second machine learning model may have a second set of gradients and gradient descending directions, the second set of gradients and gradient descending directions being different than the first set of gradients and gradient descending directions. The first machine learning model may comprise a convolutional neural network model, and the second machine learning model may comprise a variational autoencoder model.

The second machine learning model may comprise a Gaussian mixture variational autoencoder model. The Gaussian mixture variational autoencoder model may be configured to model different ones of the two or more classes into different Gaussian distributions with different means and variances. The Gaussian mixture variational autoencoder model may comprise a multi-layer perceptron encoder.

The FIG. 2 process continues with step 204, determining whether the given input represents an adversarial example based at least in part on a comparison of the classification output for the given input and the clustering output for the given input. Step 204 may include utilizing a K-nearest neighbor clustering algorithm to determine a given one of the two or more classes to which the given input belongs utilizing an embedding of the given input in a latent space produced by the second machine learning model. In step 206, responsive to determining that the given input represents an adversarial example, subsequent processing of the given input by one or more additional machine learning models is modified. Step 206 may comprise at least one of raising an alarm for manual exception handling in the one or more additional machine learning models, running the one or more additional machine learning models in a fail-safe mode, and logging the given input as a suspected adversarial example.

Adversarial example attacks are one of the most severe threats to the security of machine learning (and deep learning) applications. Due to the essence of machine learning algorithms, there are always gaps between the model boundary and the task boundary, such that conventional defense solutions will fail when counter-attack algorithms are found. Illustrative embodiments provide technical solutions for adversarial example detection which can determine whether a particular input to a machine learning algorithm is or is not an adversarial example (e.g., a likelihood or probability that a particular input represents an adversarial example). In some embodiments, the technical solutions do not seek to correct adversarial examples. Instead, the technical solutions in some embodiments utilize a separate machine learning detector model (e.g., a Gaussian Mixture Variational Auto-Encoder (GMVAE) model) which works in parallel with a machine learning classifier model (e.g., a Convolutional Neural Network (CNN) model, a Deep Neural Network (DNN) model, etc.) to try to detect adversarial examples. The machine learning detector model (also referred to herein as a detector model) is trained with the same training data set as the machine learning classifier model (also referred to herein as a classifier model) to build a continuous latent space. During inference, both the classifier and detector models will report classification and clustering results. By comparing the classification and clustering results, a determination is made as to whether a particular input is an adversarial example or not.

The technical solutions described herein are demonstrated using the Modified National Institute of Standards and Technology (MNIST) dataset. The results show that the technical solutions described herein have a comparable or more successful detection ratio than state of the art (SOTA) detectors. The technical solutions described herein, however, have very lightweight computation and memory requirements as compared with the SOTA detectors. Further, as the technical solutions described herein work on the latent space, they are easier to integrate domain specific knowledge into the clustering algorithm. The technical solutions described herein do not provide an end-to-end solution to adversarial example attacks in machine learning/deep learning applications. Once an adversarial example is detected, the detector model may initiate various remedial actions, including but not limited to: putting the machine learning application into a fail-safe mode; raising an alarm to a system administrator; reporting an exception to a governing entity; logging for postmortem analysis; etc. The technical solutions described herein provide a detector model which is helpful in various machine learning applications through security enhancements, including for edge/cloud applications which are leveraging Artificial Intelligence (AI) algorithms.

Figure 3:
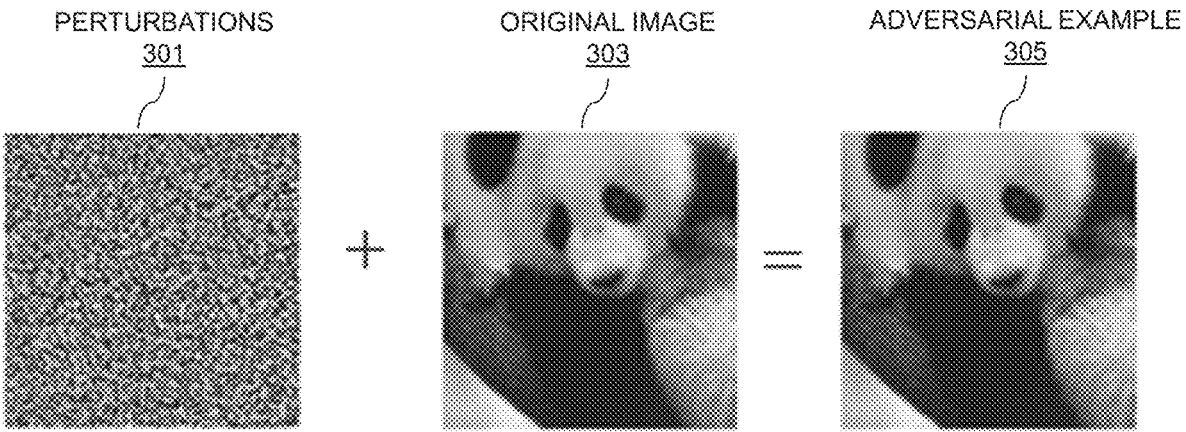
FIG. 3 shows generation of an adversarial example through applying a set of perturbations to an original image in an illustrative embodiment.

Adversarial examples are crafted examples (e.g., input) with perturbations that are imperceptible to human eyes, but which result in misclassification by a classifier model. FIG. 3 shows how an adversarial example may be crafted, by combining a set of perturbations 301 with an original image 303 to result in an adversarial example 305 that is misclassified. Here, the original image 303 of a panda when combined with the set of perturbations 301 results in an adversarial example 305 that is classified as a gibbon. As shown in FIG. 3, the set of perturbations 301 are so small that the perturbation is imperceptible by the human eye (e.g., such that the original image 303 and the adversarial example 305 both look, to the human eye, to be an image of a panda). The set of perturbations 301, however, are big enough to mislead various deep learning image classifiers (e.g., Resnet, Inception, etc.). Adversarial examples are thus very dangerous to deep learning or machine learning applications.

Consider, as an example, an adversarial attack in self-driving applications. Specifically designed sets of perturbations may be applied to road signs or other road indicators which lead to misclassifications that are dangerous to pedestrians, to the vehicle itself, etc. For example, a set of perturbations may be applied to an image of a traffic "stop" sign which results in a classifier model misclassifying the traffic "stop" sign as a "speed limit" sign. There are other types of adversarial example attacks that can be exerted from the physical world. For example, three-dimensional (3D) printing of glasses with perturbations, or directly printing perturbations on the frames of glasses, may result in a machine learning face recognition system misclassifying a person wearing such glasses (e.g., misclassifying an unauthorized individual as an authorized individual).

Figure 4A:
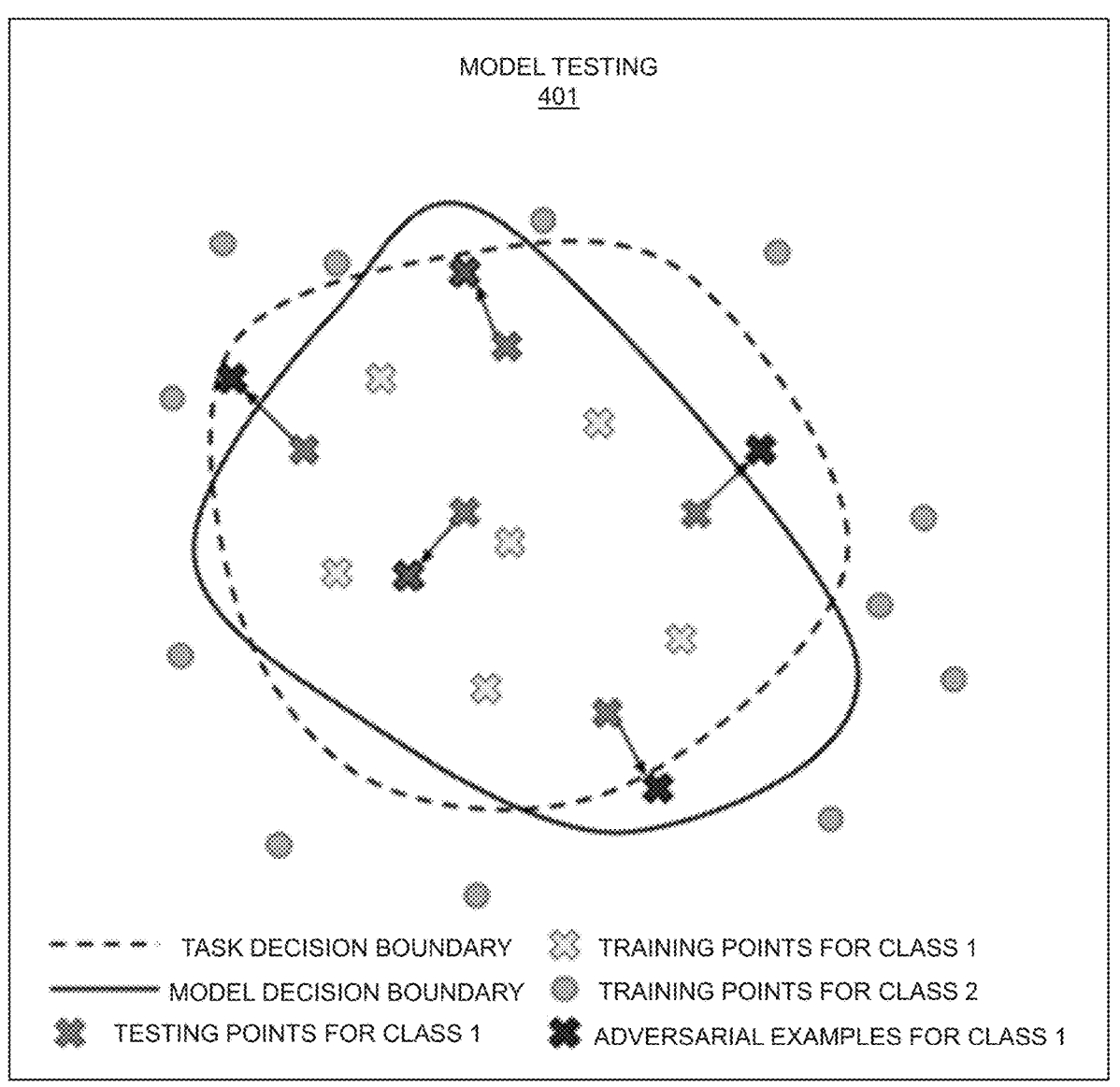
FIGS. 4A and 4B show model testing and model verification with gaps between task and model decision boundaries in an illustrative embodiment.
Figure 4B:
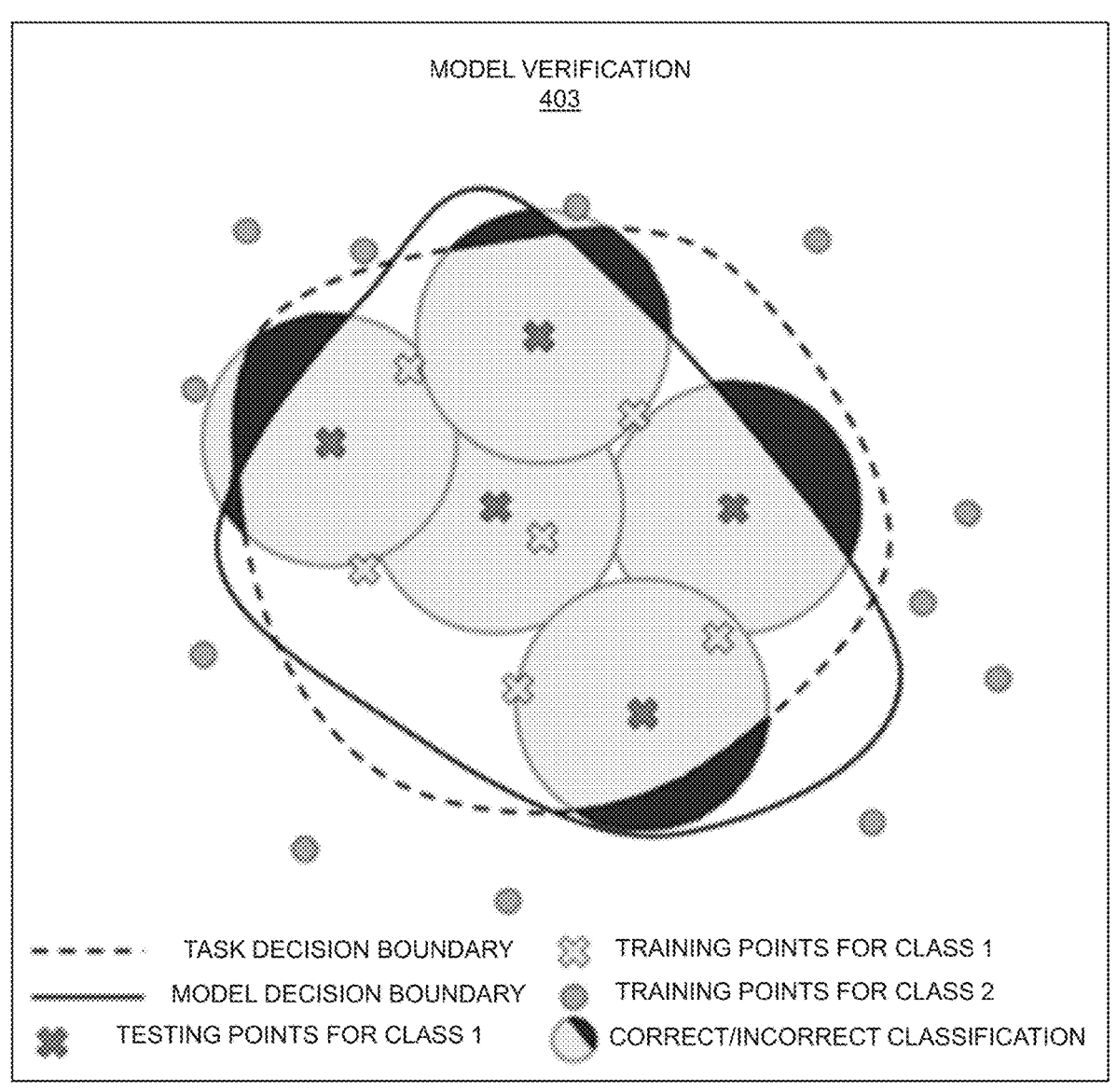

FIGS. 4A and 4B illustrate the principles of why an adversarial example can attack a machine learning system. FIG. 4A shows model testing 401, and FIG. 4B shows model verification 403. The model testing 401 shows task decision and model decision boundaries as well as training points for different classes (e.g., class 1, class 2). The model testing 401 further shows testing points and adversarial examples for one of the classes (e.g., class 1). The model verification 403 similarly shows the task decision and model decision boundaries as well as the training points for the different classes (e.g., class 1, class 2). The model verification 403 further shows testing points for one of the classes (e.g., class 1), as well as indications of correct and incorrect classifications. As illustrated in FIG. 4A, there are some gaps between the task-defined classification boundary (e.g., for example, whether a bank will determine if a credit card applicant is qualified) and the model-trained classification boundary. Hence, if an example falls into one of these gaps, the classification result will be different in the real world and the model world, as in such gap areas the classification criterions from the real and model worlds are different as highlighted by the correct/incorrect classification regions shown in FIG. 4B.

Adversarial examples try to utilize weak points to push a "normal" example into one of the gaps between the task-defined and model-trained classification boundaries with as small perturbations as possible. This is shown in FIG. 4A, which highlights the normal and adversarial examples for class 1, with the lines between the normal and adversarial examples representing the perturbation vectors. Thus, it can be seen that due to the random distribution nature of the training data points and randomness among different training data sets, there is an unavoidable deviation in the definition of the task boundary due to trying not to overfit the model such that there will always be gaps between the task-defined and model-trained classification boundaries. Such gaps represent vulnerabilities of the classifier model.

Various adversarial attack algorithms exist, which differ in their definitions on optimization subjects, norms, etc. One example of an adversarial attack algorithm is the Fast Gradient Sign Method (FGSM) illustrated in FIG. 5. Here, an original model 501, $f(x)=\sigma(w^T x)$, is perturbed 503 as $f(x')=f(x+p)=\sigma(w^T(x+p))=\sigma(w^T x+w^T p)$. The smallest perturbation direction is determined in step 505 (e.g., where $f(x')$ increases fastest when $p\|\nabla w^T$, that is, vectors p and $\nabla w^T$ are in the same direction). FIG. 5 shows a $y=f(x)$ plot 507 and an example point $x_n$ 509 where perturbations 511 are applied, with $+\nabla$ perturbation 513-1 to maximize L with respect to x, and $-\nabla$ perturbation 513-2 to minimize L with respect to w. Step 505 may utilize a Stochastic Gradient Descent (SGD) algorithm to calculate the fastest gradient descending direction for a specified normal example point $x_n$ 509. Instead of updating the gradients of model parameters, the attacking algorithm updates or perturbates 511 the input normal example point $x_n$ 509 itself on the reversed direction to push the input normal example point $x_n$ 509 in the wrong direction as fast as possible.

Figure 6:
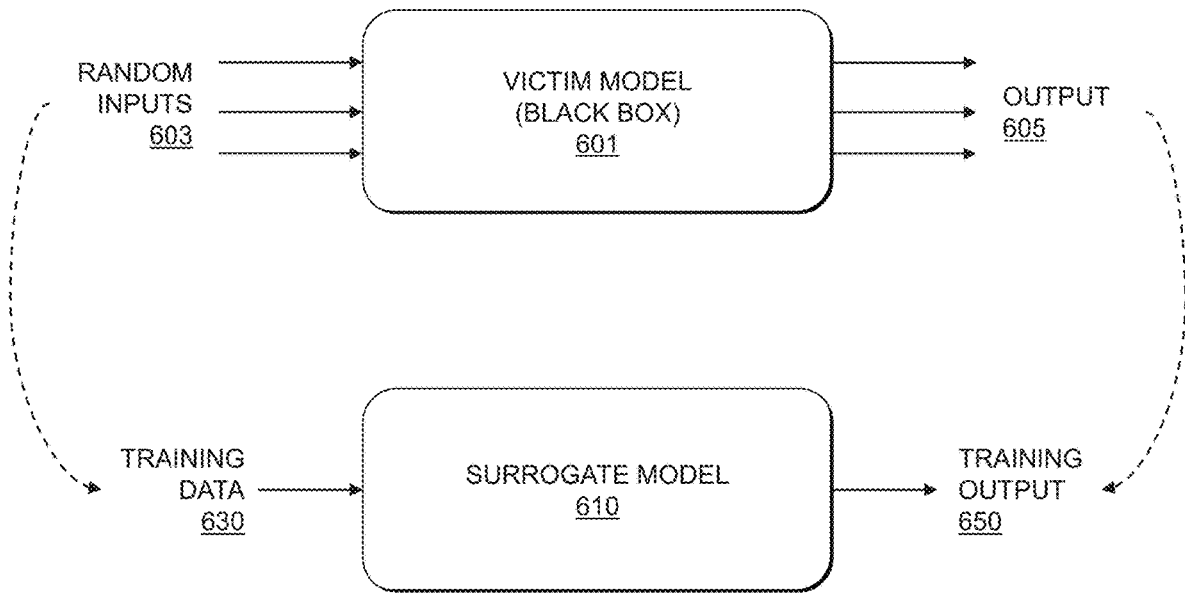
FIG. 6 shows an attack of a victim model using a surrogate model in an illustrative embodiment.

Adversarial example attack algorithms may not result in much harm if their capabilities are only as described with respect to FIG. 5 because, if an adversary wants to attack a deep learning model, the adversary must know the inside architecture of the deep learning model first so that the adversary can know the gradients of each layer of the model. This, however, is not necessarily the case. Another type of adversarial attack is referred to as a "black-box" attack that can be applied to a specific deep learning model with a Model-Stealing-with-Surrogate-Model-Training attack technique illustrated in FIG. 6. As shown in FIG. 6, a victim "black box" model 601 is supplied with many random inputs 603 to let the victim model 601 infer the corresponding outputs 605. The same inputs may be applied as training input data 630 to a surrogate model 610 to produce training output data 650. The surrogate model 610 is thus trained in a way that allows an attacker to steal all necessary information of the victim model 601. In the FIG. 6 case, the surrogate model 610 will have almost the same gradients of each layer as the victim model 601.

Figure 7:
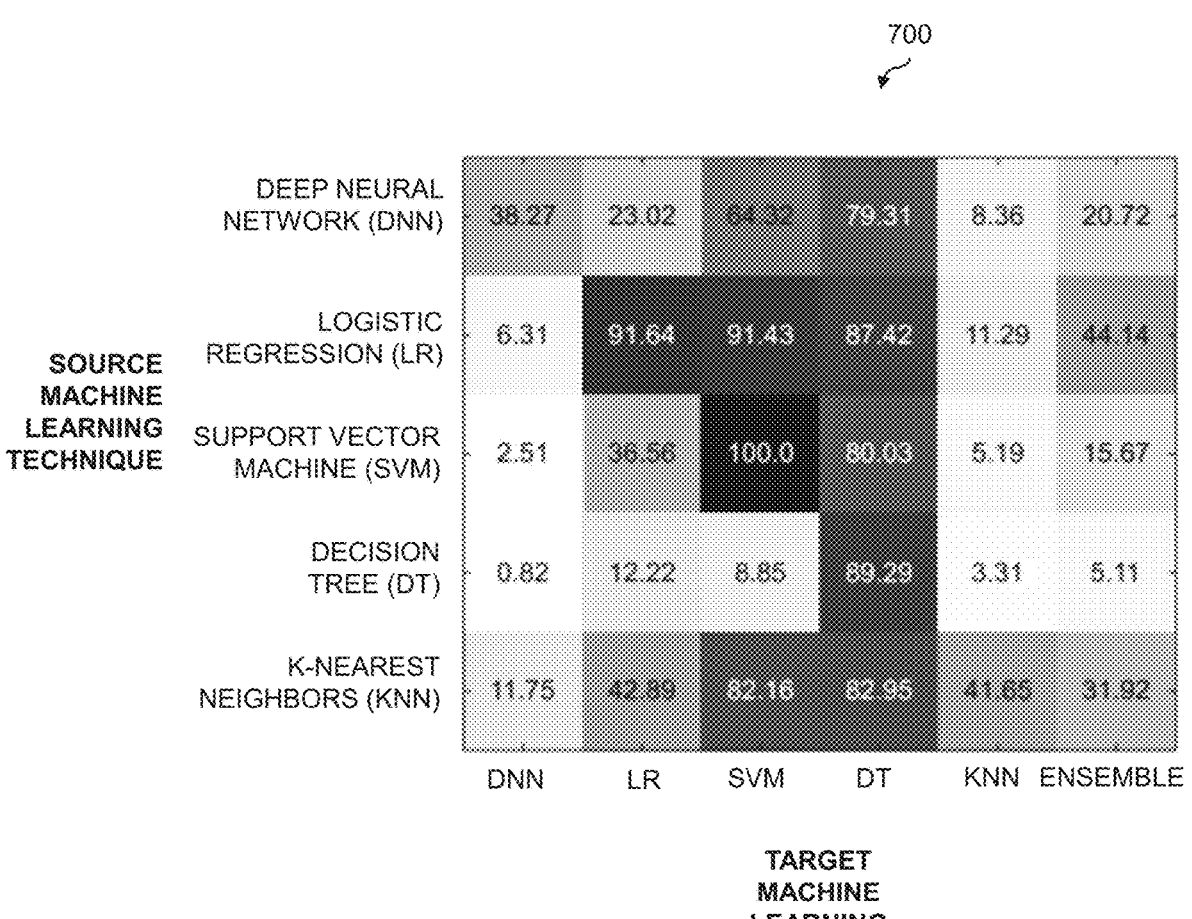
FIG. 7 shows a table illustrating transferability of adversarial examples across different machine learning techniques in an illustrative embodiment.

Unfortunately, adversarial examples are transferable among different machine learning algorithms and model architectures as shown in the table 700 of FIG. 7. From the table 700, it can be seen that if an attack generates an example that is adversarial for one machine learning algorithm (e.g., a Support Vector Machine (SVM) machine learning algorithm), it is likely also to be adversarial for other machine learning algorithms (e.g., a K-Nearest Neighbors (KNN) machine learning algorithm). In summary, with the surrogate model approach of FIG. 6 and due to the transferability of adversarial examples illustrated in the table 700 of FIG. 7, all machine learning models will have vulnerabilities (e.g., gaps between task-defined and model-trained classification boundaries). In other words, almost all deep learning/machine learning models are vulnerable to adversarial examples, and an attacker can use adversarial examples to attack almost any model, even if the attacker cannot access the model.

Figure 8:
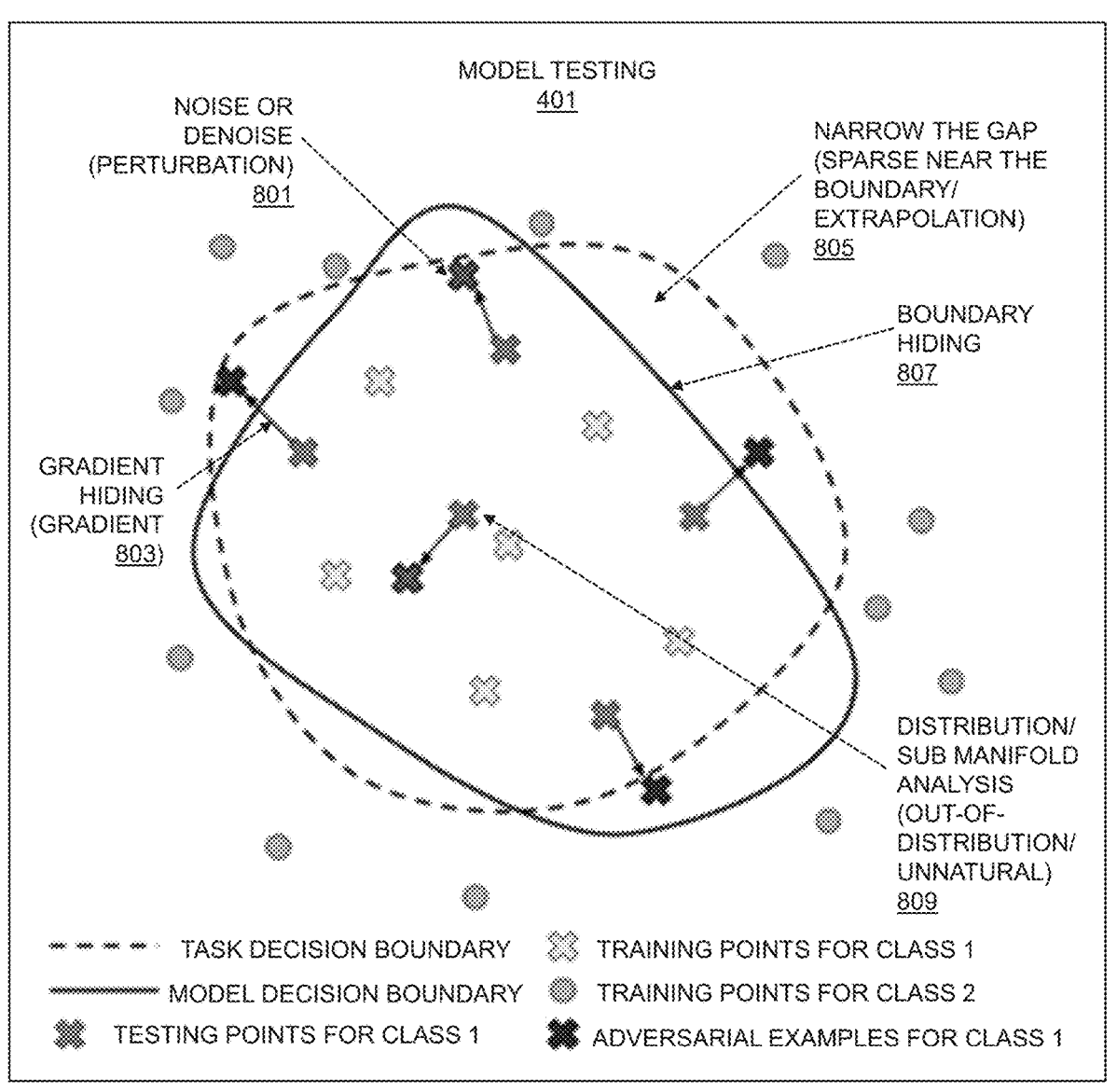
FIG. 8 shows approaches for defending against adversarial attacks in an illustrative embodiment.

Defense against adversarial example attacks is thus critical. Defense or counter-measure strategies for adversarial example attacks are generally based on attacking strategies in a one-to-one mapping fashion, as summarized in FIG. 8, which shows strategies overlayed on the model testing 401 shown in FIG. 4A. Such strategies include perturbation 801, gradient hiding 803, narrowing the gap 805, boundary hiding 807, and distribution/sub manifold analysis 809. Such strategies, however, are not an effective defense to all adversarial attacks. A claimed "effective" defense is or will be always defeated by a newer or a stronger attack. The root cause of this phenomena is that whatever strategy the defense takes, or however the defense tries, it can only make the attack more difficult because it can only narrow the gaps between the task-defined and the model-trained classification boundaries. Due to the nature of machine learning, however, such gaps between the task-defined and the model-trained classification boundaries cannot be eliminated completely. With the realization that defense against adversarial attacks is an impossible mission due to the nature of machine learning, another approach is to try to detect when a classifier model is facing adversarial examples. While detection is more promising, it is not an end-to-end solution, and other failure tolerance processing is needed.

To summarize, adversarial examples are one of the biggest threats to security of machine learning applications, and almost all machine learning models are vulnerable to adversarial examples. In addition, an attacker can attack almost all machine learning models, even if the attacker cannot directly access such models, and there is no effective defense to adversarial examples (and there may never be an effective defense), as adversarial attacks lie at the heart of machine learning algorithms themselves.

As adversarial example generation algorithms may lie inside and co-exist with machine learning algorithms, there are always gaps between the model boundary and the task boundary especially in higher dimensional space (e.g., which is almost always the case in deep learning tasks). Trying to denoise or remove the perturbations in adversarial examples is extremely difficult, and there are currently no effective defenses against adversarial example attacks.

Figure 9A:
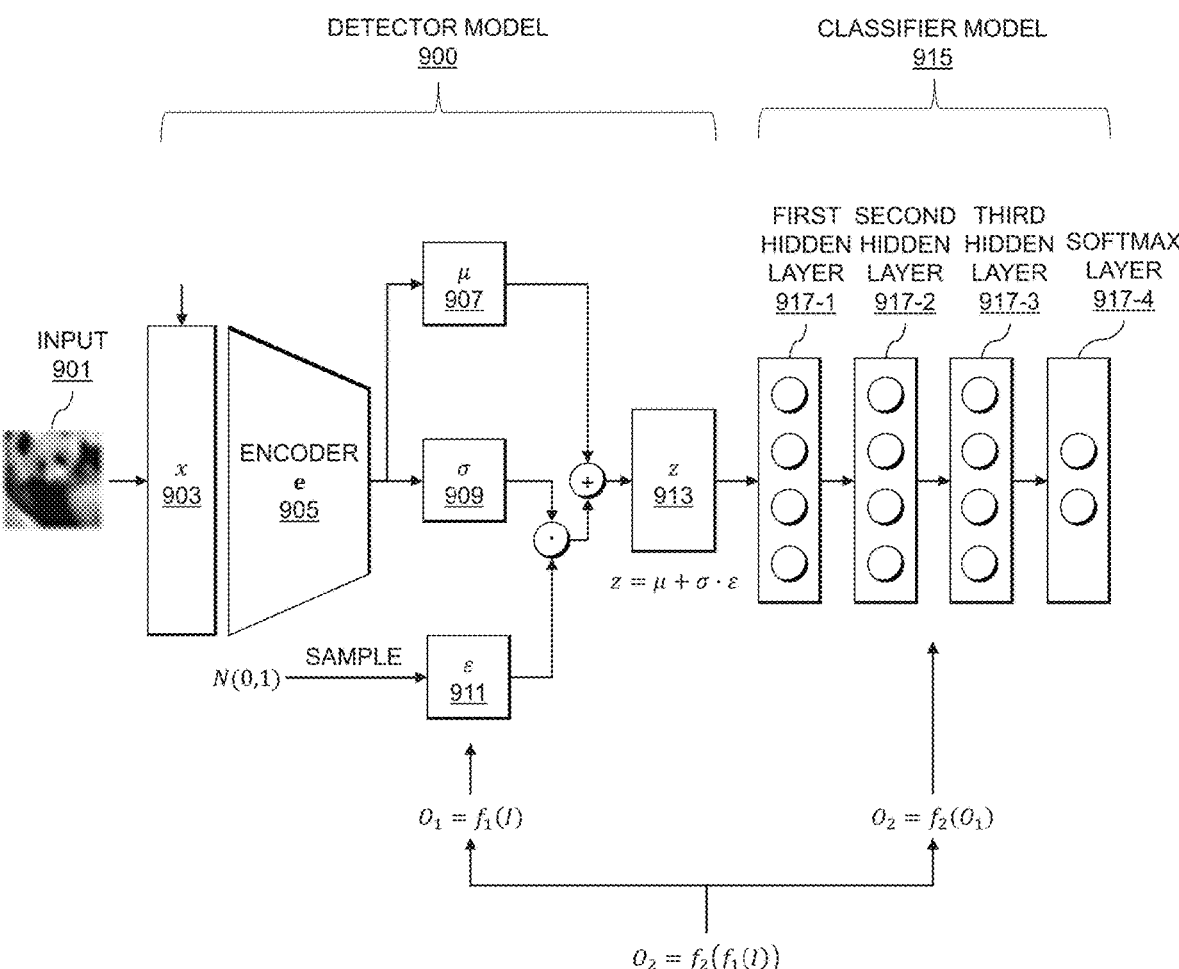
FIGS. 9A-9H show implementations of detector and classifier models for detecting adversarial examples in an illustrative embodiment.

Conventional approaches, for example, may rely on pre-positioned or post-positioned detectors which can be attacked by adversarial examples. Although the detector and classifier may be separately trained, a surrogate model may also be trained and, due to the transferability of adversarial example, such an approach will suffer from adversarial example attacks (e.g., once an attacker changes attack algorithm settings, or increases attack strength). This is illustrated in FIG. 9A, which shows an example of a prepositioned detector model 900 which is placed before a classifier model 915. An input 901 (e.g., an input image) is provided to the detector model 900, which is implemented as a Gaussian Mixture Variational Autoencoder (GMVAE) model in the FIG. 9A example. The GMVAE model converts the input 901 into a matrix x 903, which is provided to an encoder e 905. The encoder e 905 takes as input an observation (e.g., the matrix x 903) and outputs a set of parameters μ 907, σ 909 and ε 911 which specifies a distribution of a latent representation z 913 (where z=μ+ε·ε). μ 907 represents the mean of a Gaussian distribution, a 909 represents a standard deviation of the Gaussian distribution, and ε 911 represents random noise, which may be generated from a standard normal distribution (e.g., according to N(0,1)).

The classifier model 915 in the FIG. 9A example is implemented as a neural network architecture including hidden layers 917-1, 917-2 and 917-3, and a softmax output layer 917-4. The neural network architecture takes as input the distribution of the latent representation z 913, and passes that to the hidden layers 917-1, 917-2 and 917-3 of the neural network architecture, with the softmax output layer 917-4 providing outputs indicting confidence that the input 901 is each of a set of classes (e.g., different image types). The detector model 900 may be generally represented as $O_1=f_1(I)$, while the classifier model 915 may be generally represented as $O_2=f_2(O_1)$. A surrogate model can "learn" the combination $O_2=f_2(f_1(I))$ in a black-box attack, even where the detector model 900 and classifier model 915 are trained separately. While FIG. 9A shows an example where the detector model 900 is pre-positioned relative to the classifier model 915, a post-positioned detector model is similarly subject to a black-box attack using a surrogate model.

In other conventional approaches, a detector model may parse the representations in each "layer" of the neural network architecture used in the classifier model 915 to try to track the classification variations between each pair of adjacent layers to detect if the input 901 is an adversarial example. Such approaches, however, cannot be implemented for practical usage. Such detection cannot be performed in real-time due to heavy computation requirements, but many real-world use cases involve real-time applications. Consider, as an example, automated driving (e.g., automotive computer vision), where there may be millions of inputs in a single day. For such heavy computation solutions, especially when the neural network architecture is deep, a detection after days or weeks is meaningless or not useful. Further, trying to track the classification variations between each pair of adjacent layers to detect if the input 901 is an adversarial example is very difficult in practice. This is illustrated by FIGS. 9B-9D.

Figure 9B:
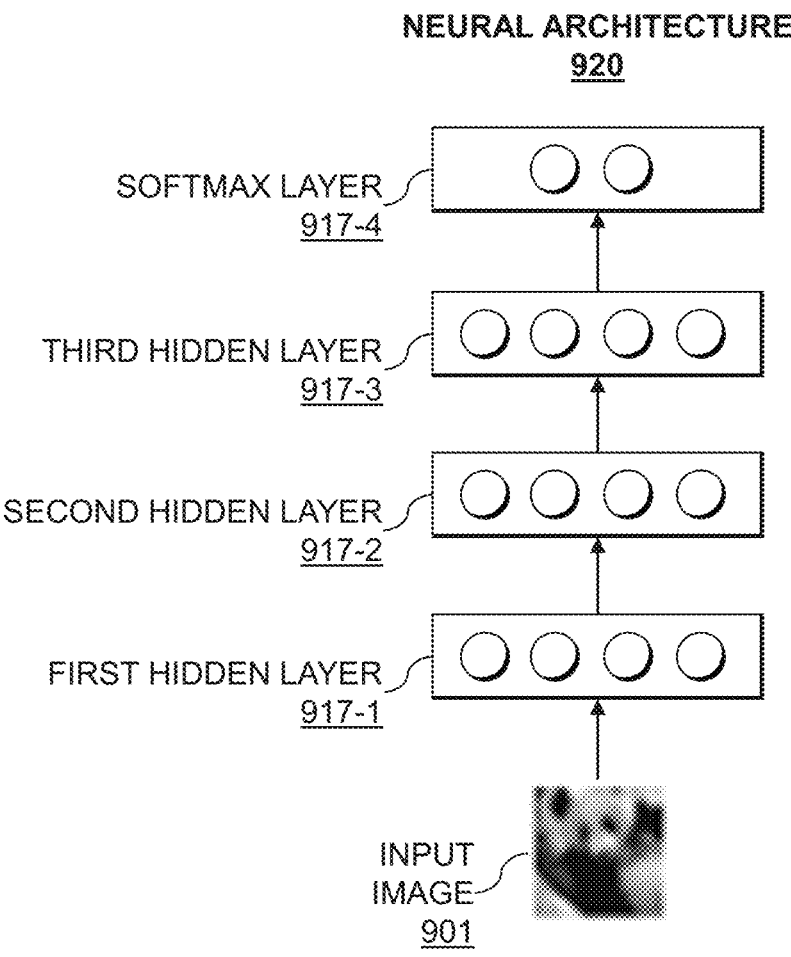
Figure 9C:
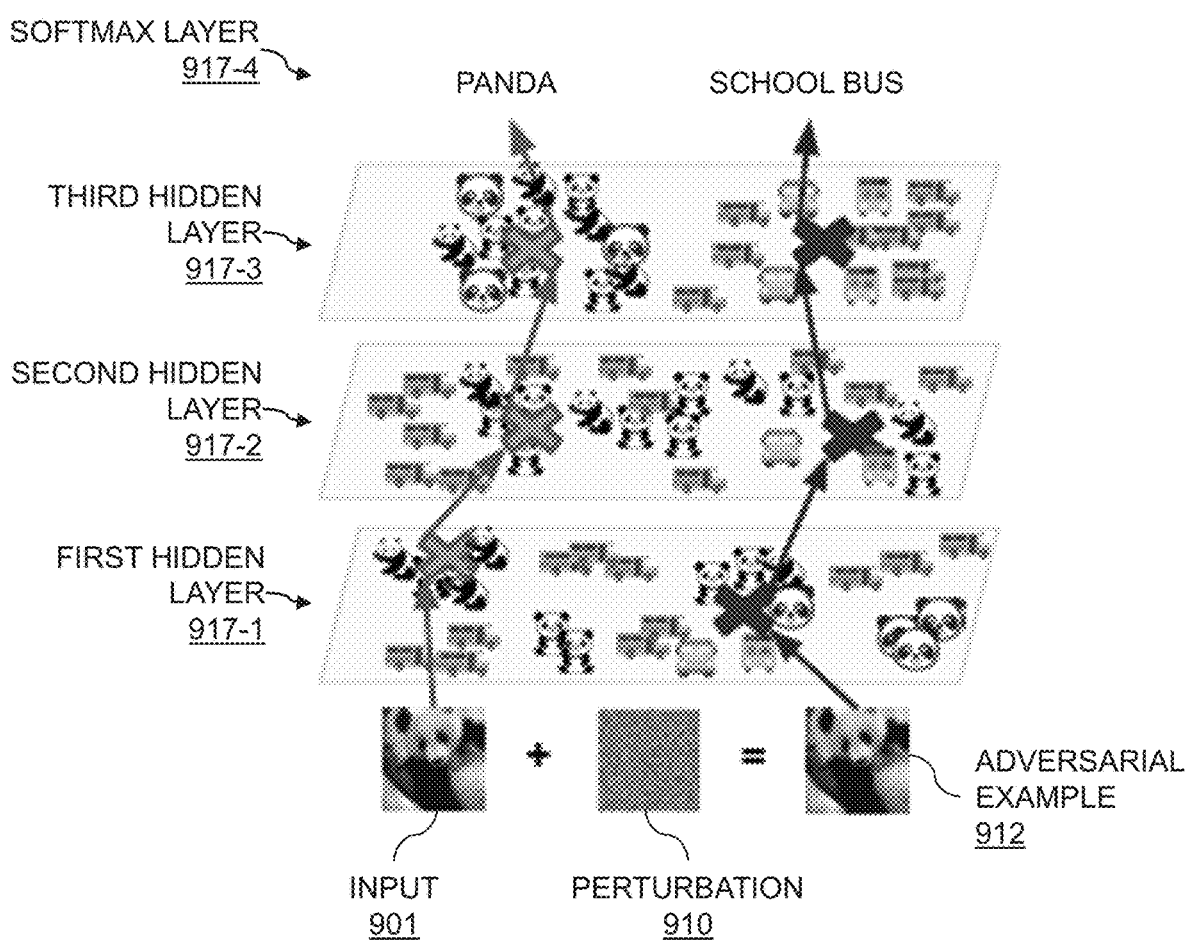
Figure 9D:
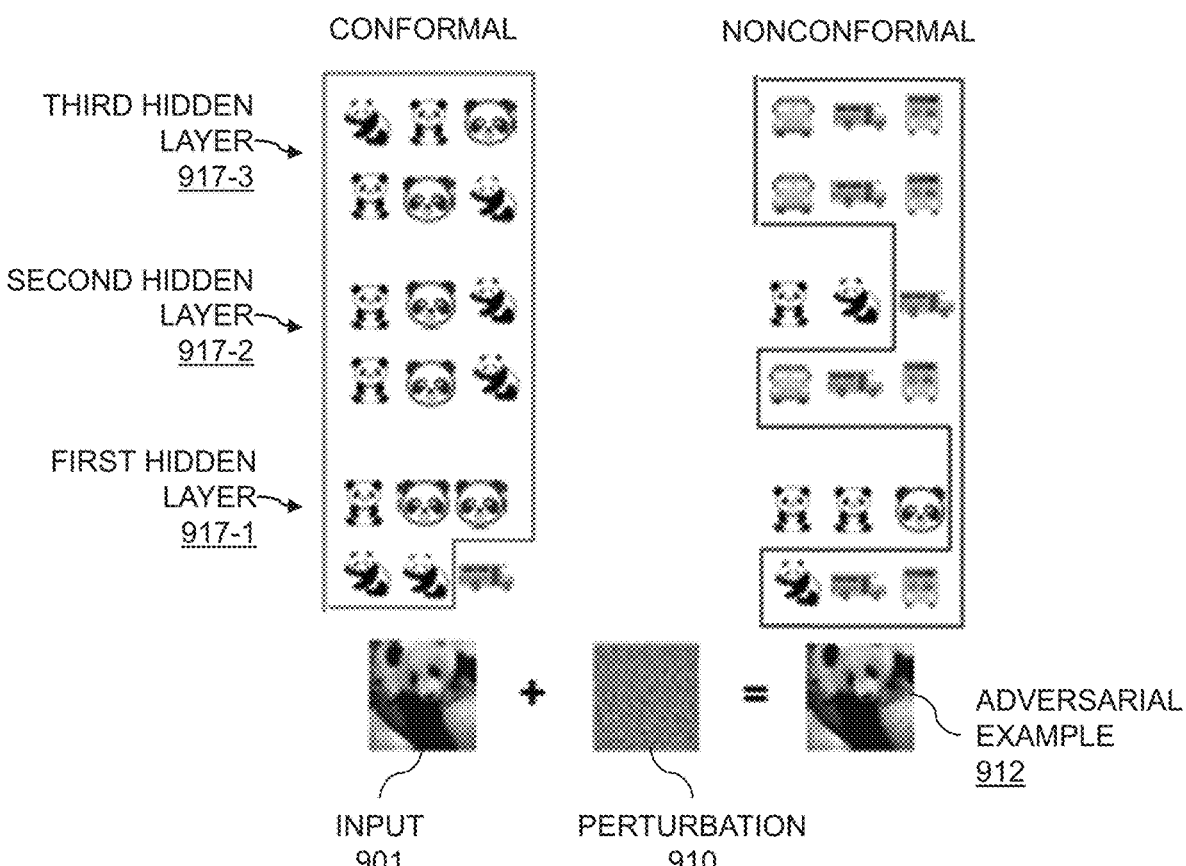
Figure 9E:
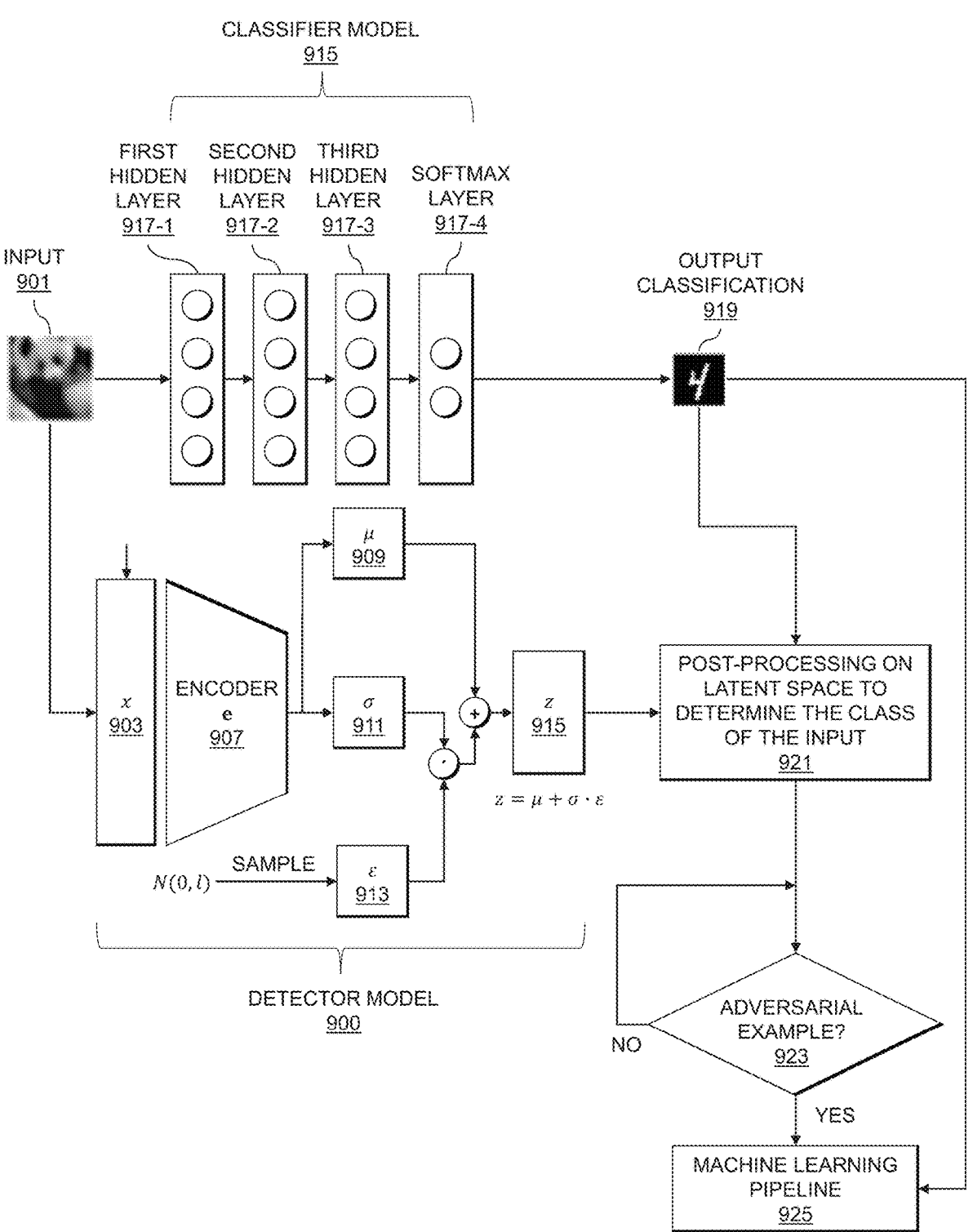

FIG. 9B shows the neural architecture 920, including the first hidden layer 917-1, the second hidden layer 917-2, the third hidden layer 917-3, and the softmax output layer 917-4. The input 901 is provided to the hidden layers 917-1, 917-2 and 917-3 to learn representations of local features in representation spaces 930 as shown in FIG. 9C where an adversarial example 912 is provided, with the adversarial example 912 being a combination of the input 901 and a set of perturbations 910. At each layer, a nearest neighbors 940 approach (e.g., a KNN approach) shown in FIG. 9D or other statistical algorithm may be used to determine the class for the representations. The representations in early layers of the neural architecture 920 are for local features, where it is difficult to use KNN or other statistical algorithms to determine the class for the representations. In later layers of the neural architecture 920, the representations are for the whole input example, but here the KNN or other statistical algorithm may already be in the wrong class. Hence, in practice, it is very difficult to know exactly which layers that a KNN or another statistical algorithm should be applied on to determine if the representations have been pushed towards the wrong class (e.g., a "school bus" class rather than a "panda" class in the example of FIGS. 9B-9D). The technical solutions used in some embodiments separate a detector model from a classifier model, to help detect adversarial examples at any time when an example is suspect. For ease of illustration, this technical solution is described below in the context of the same detector model 900 (e.g., a GMVAE) and classifier model 915 (e.g., a deep learning/machine learning classifier model) discussed above with respect to FIG. 9A, though the detector model 900 and the classifier model 915 are arranged in a different architecture as shown in FIG. 9E. FIG. 9E shows the overall architecture design used in some embodiments with the detector model 900 separated from the classifier model 915. The input 901 is provided to both the detector model 900 and the classifier model 915. The classifier model 915 generates or reports a classification result 919 to a machine learning pipeline 925. The detector model 900 runs in parallel on the input 901, which generates an embedding of the same input 901 as the classifier model 915 in the latent representation z 913.

Post-processing in block 921 is performed on the latent space or representation to determine the class of the input 901. The post-processing in block 921 may utilize KNN (or another statistical approach), together with the embeddings of all training data points, to determine which class the input 901 should belong to. In block 923, a determination is made as to whether the input 901 is an adversarial example. If so, that information (e.g., a reported suspicion that the input 901 represents an adversarial example) is provided to the machine learning pipeline 925. It is important to note that the goal in some embodiments is not to provide an end-to-end solution to "correct" (e.g., remove or denoise) adversarial examples. Instead, some embodiments seek to report the suspicion (e.g., that the input 901 is an adversarial example) to the machine learning pipeline 925 so that the machine learning application has a chance for further processing (e.g., in a manner similar to that of traditional programming applications for raising an alarm for manual exception handling, resorting to fail-safe mode, postmortem analysis, etc.).

Figure 9F:
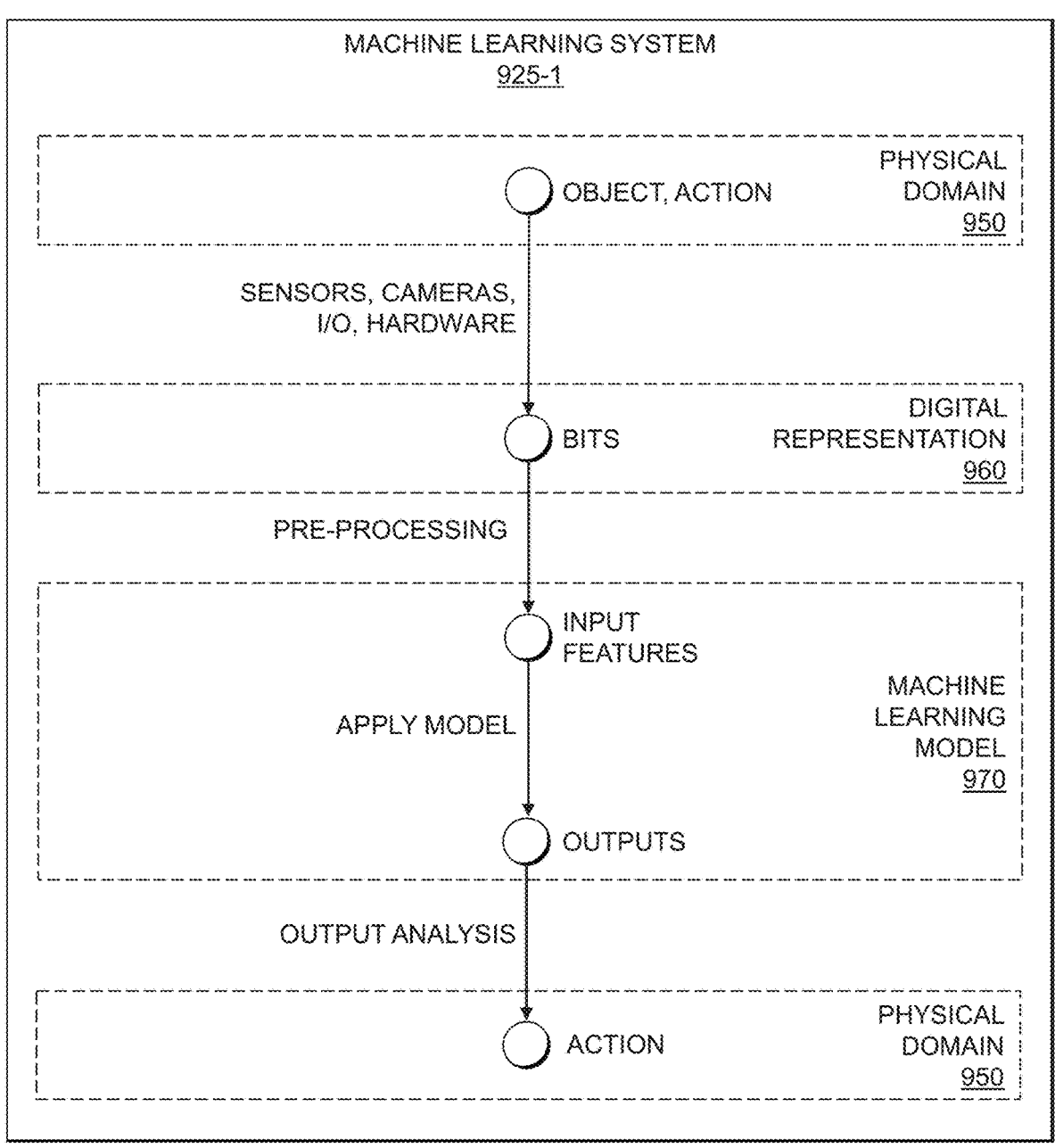
Figure 9G:
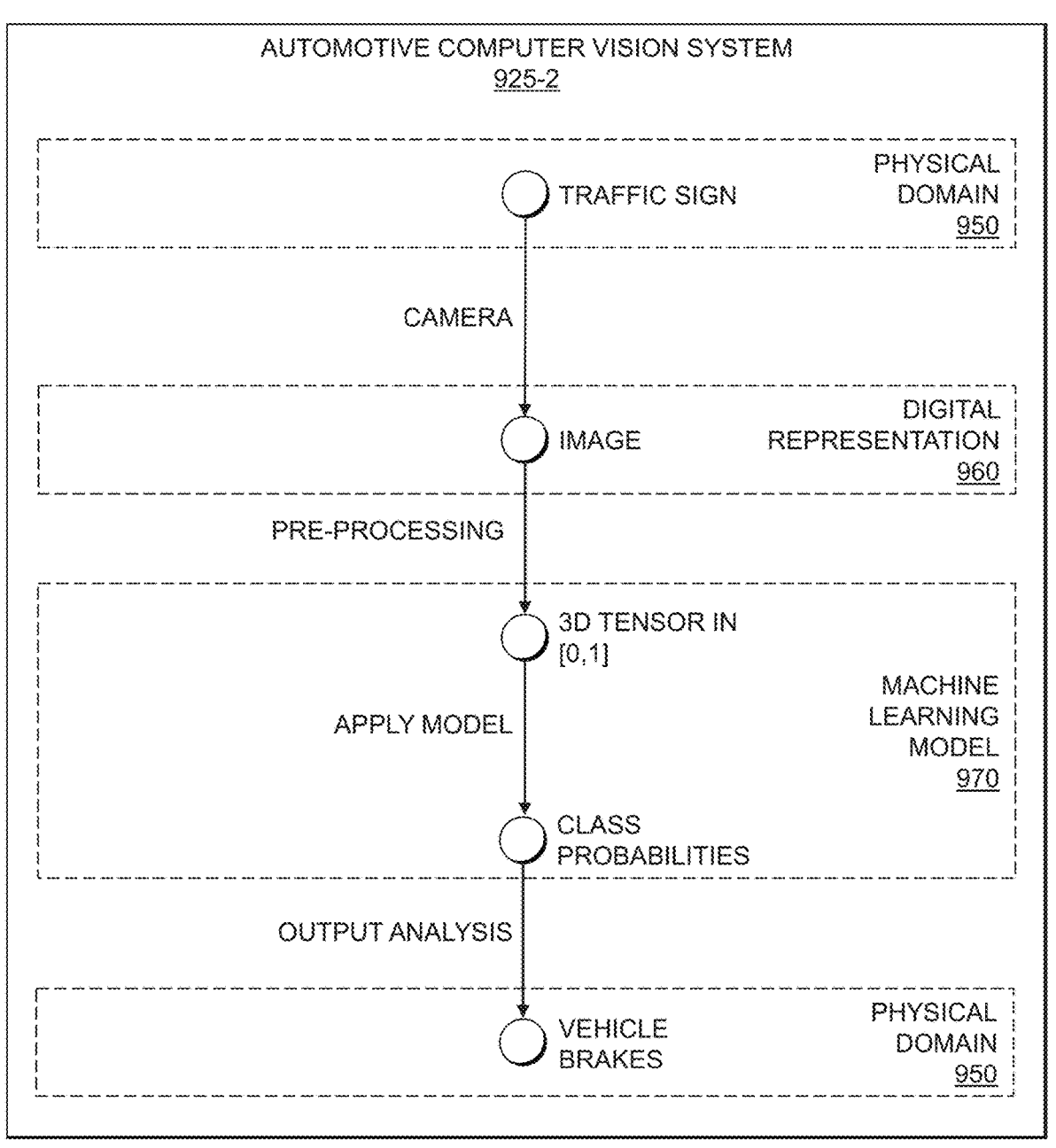
Figure 9H:
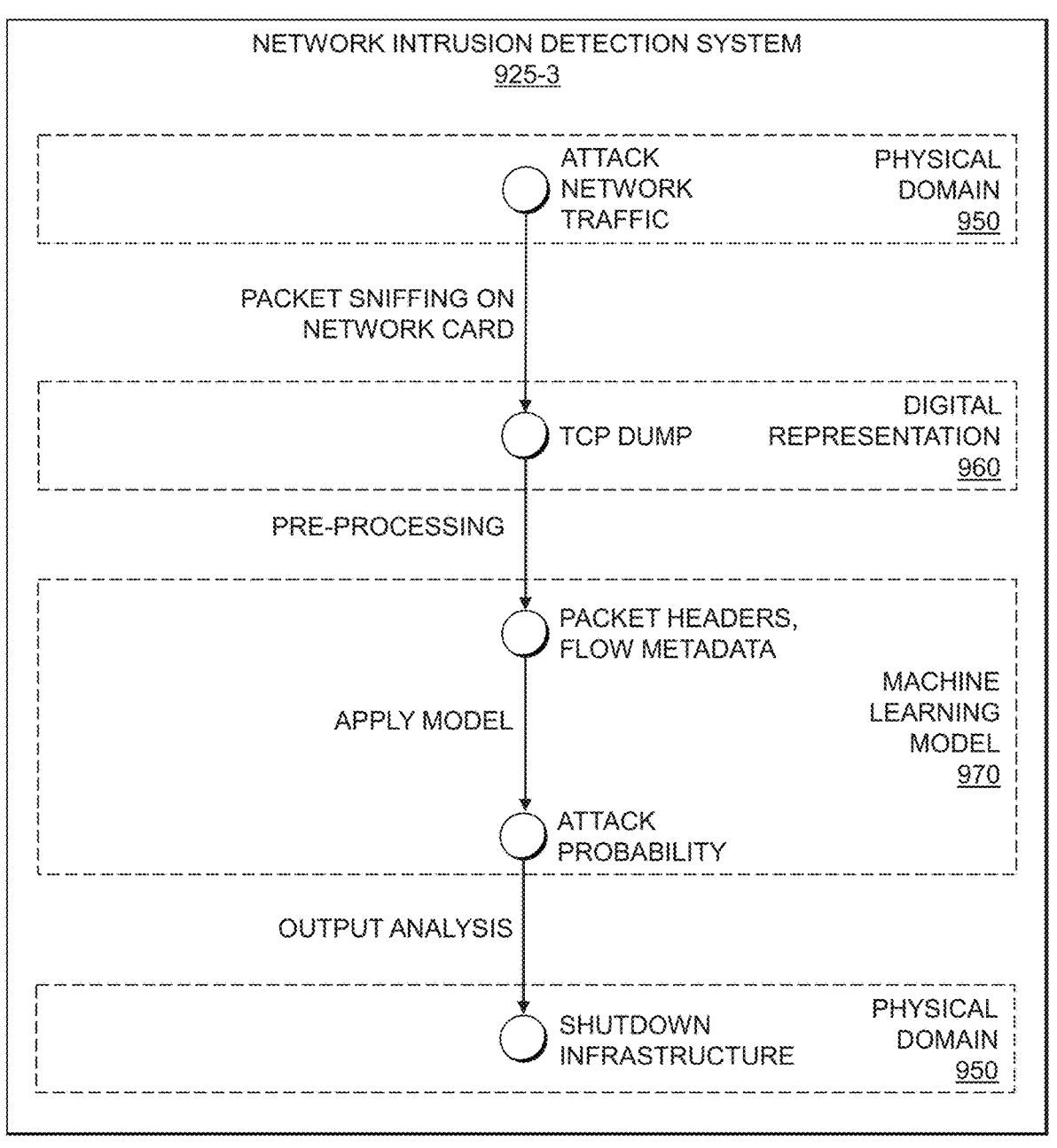

FIGS. 9F-9H show example implementations of the machine learning pipeline 925. FIG. 9F shows a generic machine learning system 925-1, where some object and/or action in a physical domain 950 is captured (e.g., using sensors, cameras, I/O, hardware, etc.) and converted as a set of bits in a digital representation 960. Pre-processing is applied to the set of bits to determine input features for a machine learning model 970. The machine learning model 970 is applied to the input features to determine outputs, which are subject to output analysis to determine some action to take in the physical domain 950. FIG. 9G shows an automotive computer vision system 925-2, where the object in the physical domain 950 may be a traffic sign that is captured by a camera and converted as an image in the digital representation 960. Pre-processing is applied on the image to generate input features (e.g., a 3D tensor in [0,1]). The machine learning model 970 is then applied to determine class probabilities which are analyzed to determine action to take in the physical domain 950 (e.g., whether to apply a vehicle's brakes). FIG. 9H shows a network intrusion detection system 925-3, where the object in the physical domain 950 may be attack network traffic that is captured by packet sniffing on a network card and converted as a TCP dump in the digital representation 960. Pre-processing is applied on the TCP dump to generate input features (e.g., packet headers, flow metadata). The machine learning model 970 is then applied to determine an attack probability, which is analyzed to determine action to take in the physical domain 950 (e.g., whether to shut down some network infrastructure).

In the description below, the FGSM adversarial attacking algorithm described above with respect to FIG. 5 is used on the MNIST dataset to analyze the technical solutions described herein.

The detector model 900 is assumed to by a GMVAE network model, while the classifier model 915 is assumed to use a CNN network model. GMVAE and CNN networks are advantageously very different in their architectures (e.g., numbers of layers, operators, etc.). This ensures that gradients and their descending directions in the two networks should be very different so that the gradient ascending direction found by adversarial example attack algorithms against the classifier model 915 will not be effective (or have reduced effectiveness) on the detector model 900.

Figure 10C:
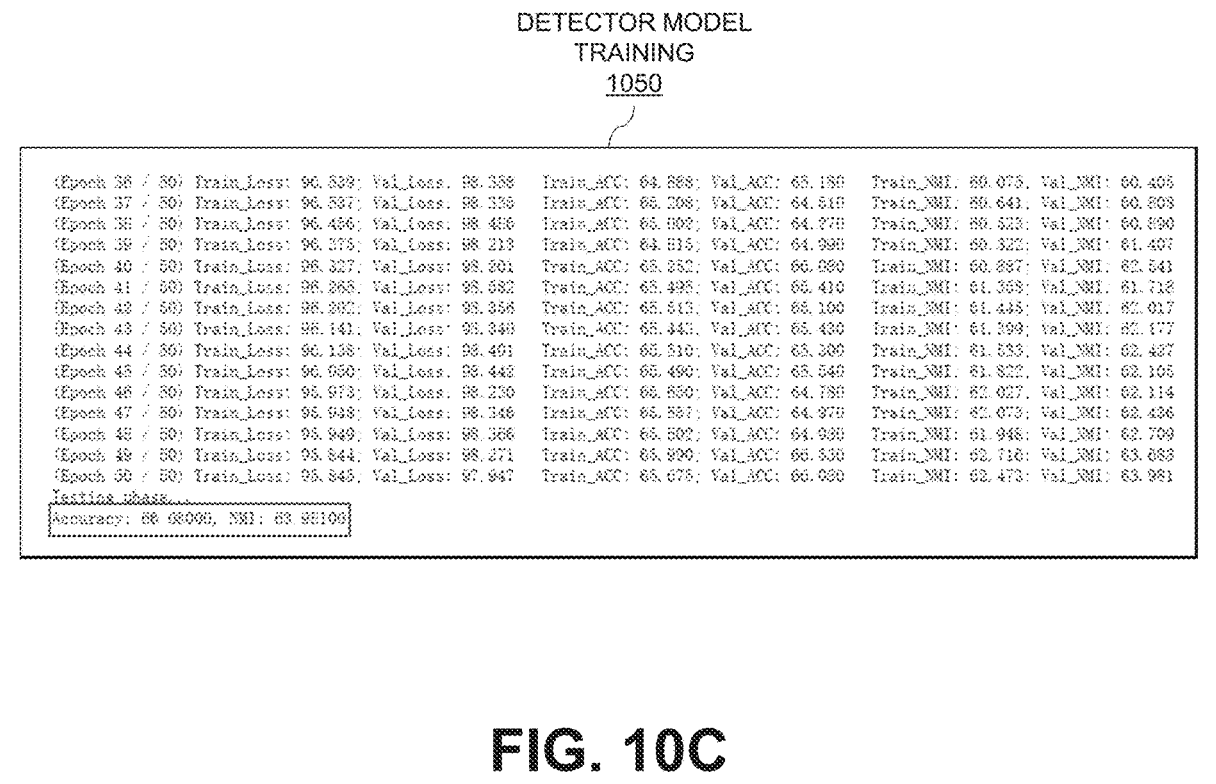

FIG. 10A shows pseudocode 1000 of a CNN with two layers of convolution and a layer of full connection which may be used to implement the classifier model 915. It should be noted that a more complicated CNN architecture or other type of classification model can be used for higher classification precision. FIG. 10B shows pseudocode 1025 of a GMVAE working as an Encoder-Decoder which may be used to implement the detector model 900. It should be noted that other variants of a Variational Autoencoder (VAE) may also be used, with sophisticated machine learning algorithms in the latent space. GMVAE advantageously provides the ability to model different classes in the training set into different Gaussian distributions with different means and variances, so that the embeddings in the latent space can be better clustered and easier to further process. As illustrated in the pseudocode 1025 of FIG. 10B, the GMVAE uses a Multi-Layer Perceptron (MLP) with full connection layers as the encoder, which is very different from the CNN classifier shown in the pseudocode 1000 of FIG. 10A. A symmetric network is used for the decoder of the GMVAE as well. Again, it should be noted that more complex MLP networks or other more complicated GMVAE or other VAE models can be used for higher precision, as long as the network architecture is different than that used for the classifier model 915. FIG. 10C shows pseudocode 1050 of a portion of training results for the GMVAE architecture shown in the pseudocode 1025 of FIG. 10B. The GMVAE is trained for 50 epochs, until the output from the decoder is discernable. Although the accuracy is low and the normalized mutual information (NMI) is still very high, this is enough for illustration purposes. In practice, the detector model may be subject to additional training for higher accuracy and improved performance.

Figure 11:
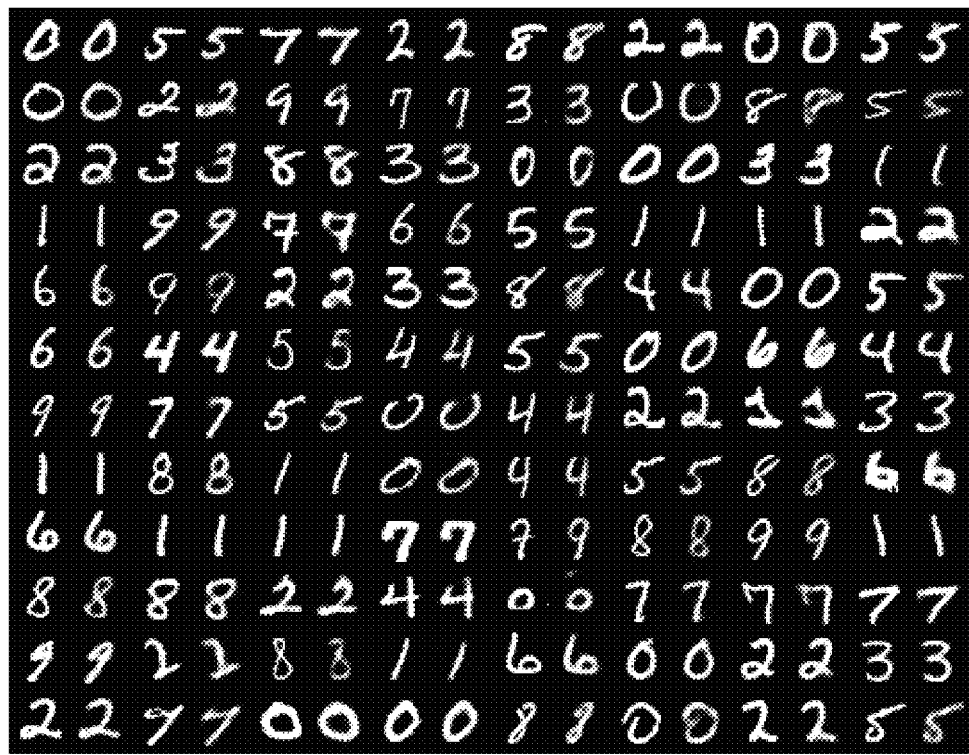
FIG. 11 shows example output of a detector model in an illustrative embodiment.

FIG. 11 shows output examples 1100 generated from the trained detector model (e.g., the trained GMVAE model). FIG. 12 shows a plot 1200 with clusters of embeddings for classes 0-9 in the output examples 1100. A Ski-learn Gaussian Mixture application programming interface (API) may be used to cluster the embeddings (e.g., for classes 0-9) into 10 clusters as shown in plot 1200. Because GMVAE is used to encode the training data, the embeddings in the latent space can be well clustered as illustrated in FIG. 12. The plot 1200 of FIG. 12 utilizes a t-Distributed Stochastic Neighbor Embedding (t-SNE) visualization of the embeddings in the latent space.

Adversarial examples are generated with FGSM, and then tested against the main classifier model to determine if the classifier model can correctly classify the generated adversarial examples. The FGSM has an almost 98% success ratio against the classifier model. The same adversarial examples are also detected in the latent space using the detector model (e.g., the same adversarial examples are provided as input to both the classifier model and the detector model). The adversarial examples are encoded into embeddings in the latent space, and KNN is used to classify the embeddings of the adversarial examples with embeddings generated from the training data set as classification examples. FIG. 13 shows pseudocode 1300 for generating detection results, illustrating that the detector model has an almost 89% success rate. As noted above, for purposes of illustration a simple MLP architecture is used for the GMVAE detector model, which is trained for only 50 epochs (e.g., because VAE models are difficult to train to convergence). Even with this simple architecture and limited training, very high performance in detecting adversarial examples is achieved. With more sophisticated network architecture and training to full convergence, performance will improve.

The technical solutions described herein use a combination of a classifier model (e.g., a CNN or other type of machine learning model) and a detector model (e.g., a GMVAE or other type of VAE model) to detect adversarial examples with much less computation effort and latency than conventional approaches for detecting adversarial examples. The technical solutions described herein may be integrated with other domain-specific knowledge and are easy to tailor for a specific problem. The technical solutions described herein can also be easily generated or adapted to different problem domains, whereas conventional approaches are often designed for a specific problem domain.

Figure 14:
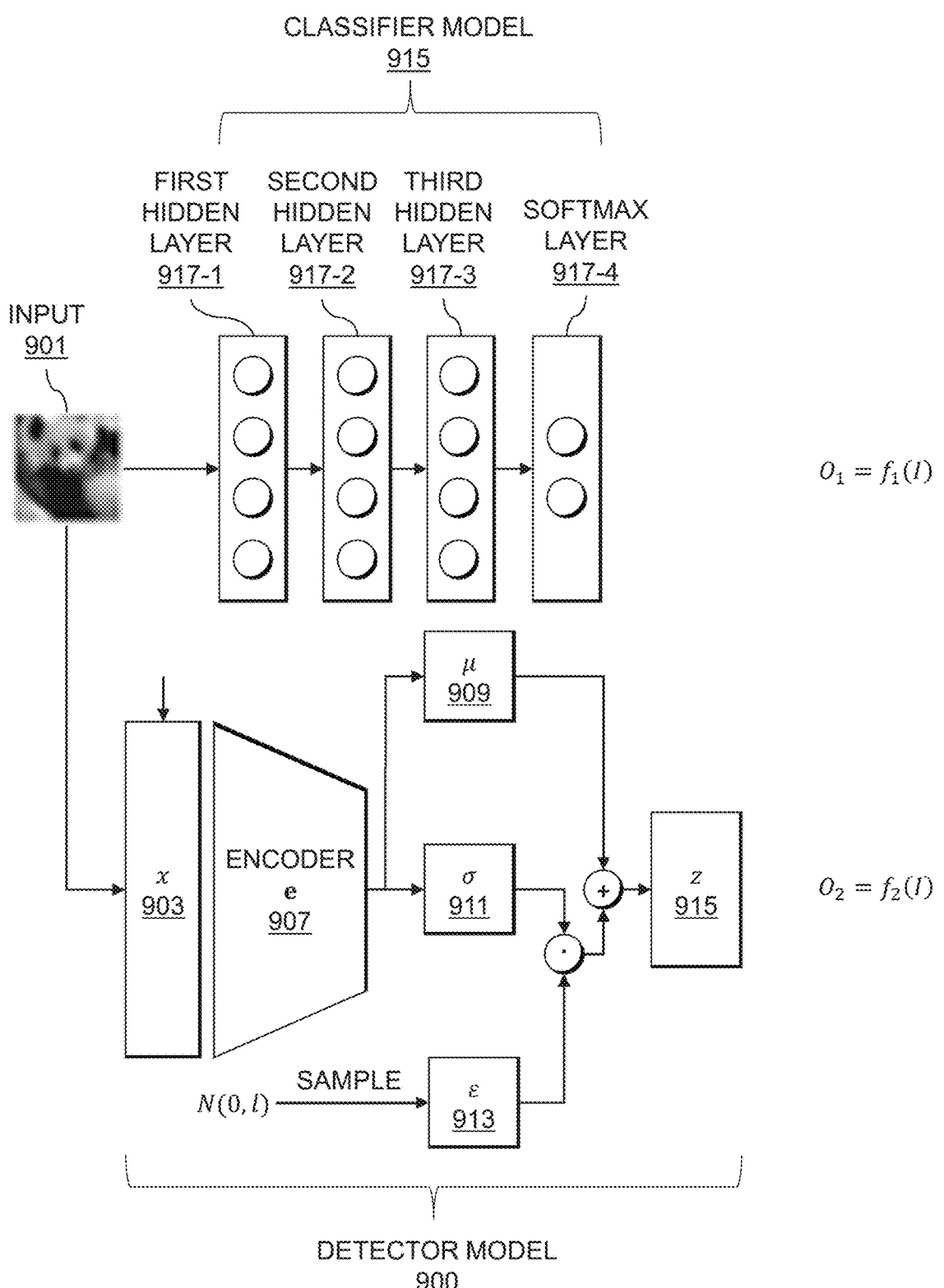
FIG. 14 shows an adversarial example detection architecture with a detector model that is separate from a classifier model in an illustrative embodiment.

In some embodiments, a separate detector model is used rather than a co-existing detector (e.g., which is pre-positioned or post-positioned relative to a classifier model), and may replace use of a de-noiser or purifier that defends against adversarial examples. The separate detector model is "hidden" from adversarial attack algorithms, as illustrated in FIG. 14, where the classifier model 915 is $O_1=f_1(I)$ and the detector model 900 is $O_1=f_2(I)$. This is compared with the co-existing classifier/detector approach illustrated in FIG. 9A, where $O_2=f_2(f_1(I))$. With the separate detector architecture approach of FIG. 14, an attacker must fight in two fields (e.g., two sets of field gradients), and $f_2$ is invisible to the attacker (e.g., the separate detector model is hidden from adversarial attacks).

In some embodiments, a GMVAE model is used instead of a denoising autoencoder, a conditional VAE (CVAE) or a Generative Adversarial Network (GAN). The latent space in a denoising autoencoder is a discrete space, which is inconvenient for latent space processing to detect adversarial examples. CVAE will encode the class information into the latent space also, which will result in some dimensions in the latent space which are also discrete and hence the distribution of the latent variables is not smooth. Although GAN is better than VAE in high resolution image generation, this advantage is in generation of high fidelity background which is not useful for the purpose of adversarial example detection. For adversarial example detection, it is desired to remove as many irrelevant features from the latent space as possible, while keeping useful features. GAN also has disadvantages in that it is inconvenient to sample from the latent space, and lacks support for full data distribution. GMVAE provides advantages in that the latent variables in the latent space can be well clustered which is convenient for post-processing. The detector model in some embodiments can achieve real-time or near real-time feedback, due to its light computation overload in the latent space only (e.g., instead of between each pair of layers). The technical solutions described herein can be extended to various other machine learning algorithms (e.g., used for the classifier and detector models) in the latent space, and can integrate domain specific knowledge into post-processing (e.g., where the domain specific knowledge cannot be easily expressed in the training data set).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for detection of adversarial example input to machine learning models will now be described in greater detail with reference to FIGS. 15 and 16. Although described in the context of system 100, these platforms may also be used to implement at least portions of other information processing systems in other embodiments.

Figure 15:
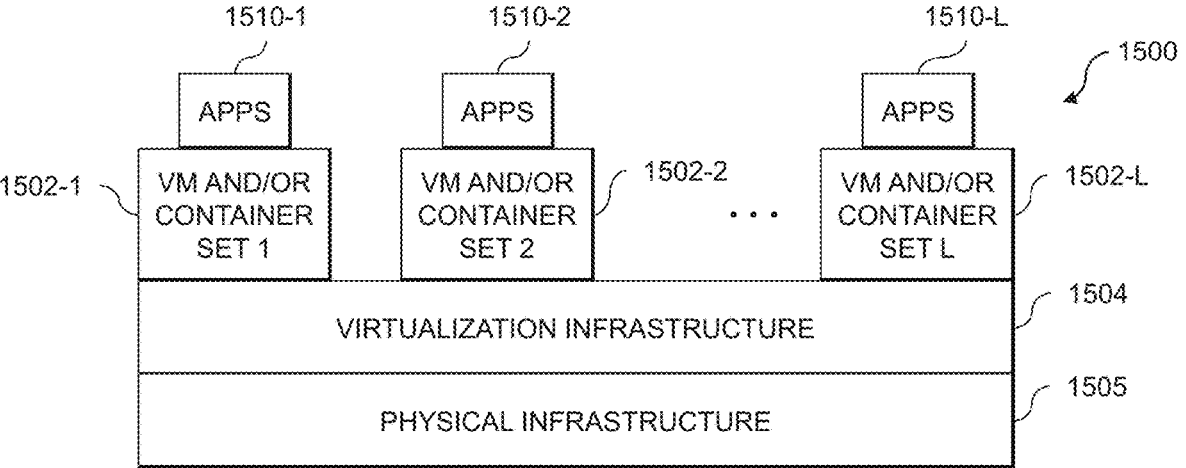
FIGS. 15 and 16 show examples of processing platforms that may be utilized to implement at least a portion of an information processing system in illustrative embodiments.
Figure 16:
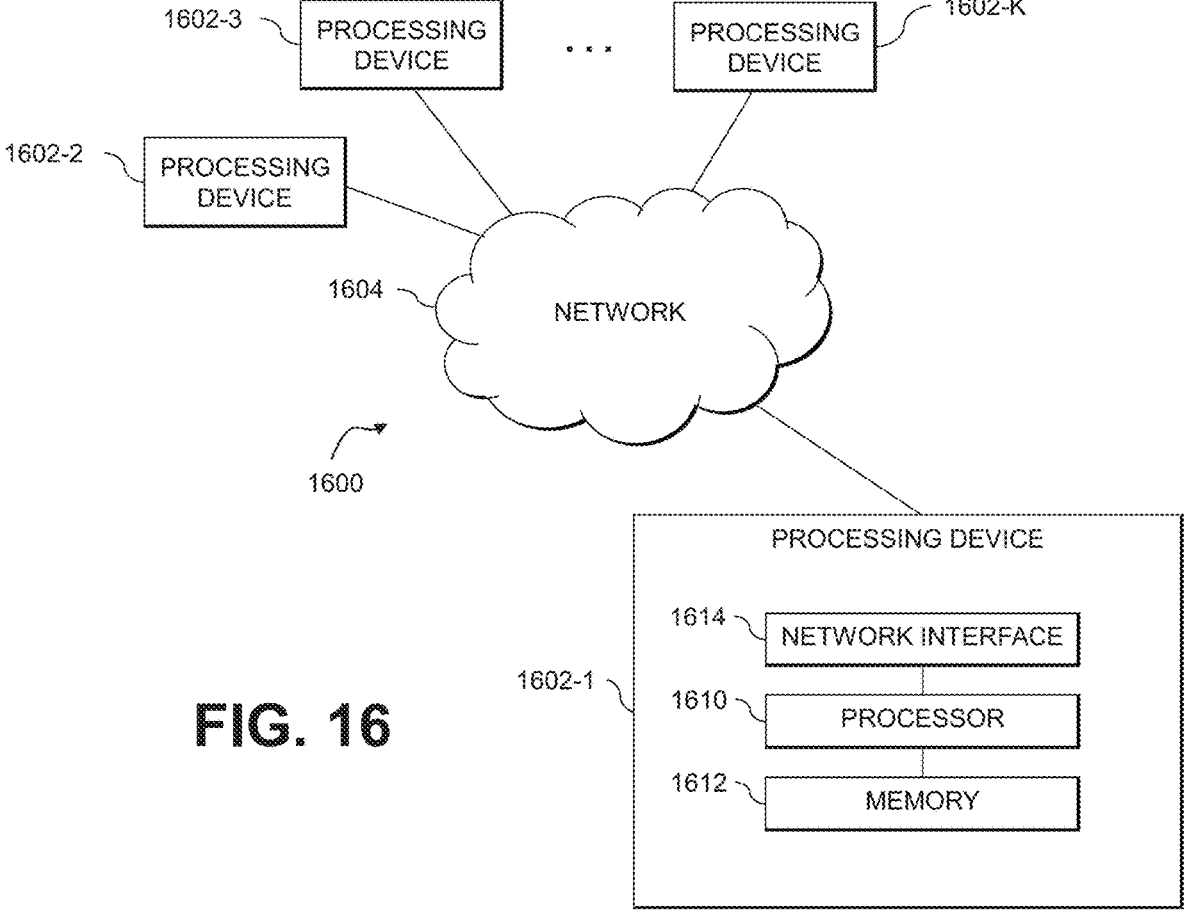

FIG. 15 shows an example processing platform comprising cloud infrastructure 1500. The cloud infrastructure 1500 comprises a combination of physical and virtual processing resources that may be utilized to implement at least a portion of the information processing system 100 in FIG. 1. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. A hypervisor platform may be used to implement a hypervisor within the virtualization infrastructure 1504, where the hypervisor platform has an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detection of adversarial example input to machine learning models as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

utilizing a first machine learning model to determine a classification output for a given input, the classification output indicating probability of the given input belonging to each of a set of two or more classes, the first machine learning model utilizing a first architecture type, the first architecture type having a first set of gradients and associated gradient descending directions;

utilizing a second machine learning model to determine a clustering output for the given input, the clustering output indicating which of a set of two or more clusters that the given input belongs to, the set of two or more clusters corresponding to respective ones of the two or more classes, the second machine learning model utilizing a second architecture type different than the first architecture type, the second architecture type having a second set of gradients and associated gradient descending directions different than the first set of gradients and associated gradient descending directions;

determining whether the given input represents an adversarial example based at least in part on a comparison of the classification output for the given input and the clustering output for the given input; and responsive to determining that the given input represents an adversarial example, modifying subsequent processing of the given input by one or more additional machine learning models.

2. The apparatus of claim 1 wherein the architecture type comprises a first neural network architecture and the second architecture type comprises a second neural network architecture different than the first neural network architecture.

3. The apparatus of claim 1 wherein the first machine learning model utilizes at least one of different types of hidden layers and different numbers of hidden layers than the second machine learning model.

4. The apparatus of claim 1 wherein the first machine learning model utilizes different operators than the second machine learning model.

5. The apparatus of claim 1 wherein the first machine learning model comprises a convolutional neural network model, and wherein the second machine learning model comprises a variational autoencoder model.

6. The apparatus of claim 1 wherein the second machine learning model comprises a Gaussian mixture variational autoencoder model.

7. The apparatus of claim 6 wherein the Gaussian mixture variational autoencoder model is configured to model different ones of the two or more classes into different Gaussian distributions with different means and variances.

8. The apparatus of claim 6 wherein the Gaussian mixture variational autoencoder model comprises a multi-layer perceptron encoder.

9. The apparatus of claim 1 wherein the second machine learning model operates on the given input in parallel with the first machine learning model.

10. The apparatus of claim 1 wherein determining whether the given input represents an adversarial example based at least in part on the comparison of the classification output for the given input and the clustering output for the given input comprises utilizing a K-nearest neighbor clustering algorithm to determine a given one of the two or more classes to which the given input belongs utilizing an embedding of the given input in a latent space produced by the second machine learning model.

11. The apparatus of claim 1 wherein modifying subsequent processing of the given input by the one or more additional machine learning models responsive to determining that the given input represents an adversarial example comprises raising an alarm for manual exception handling in the one or more additional machine learning models.

12. The apparatus of claim 1 wherein modifying subsequent processing of the given input by the one or more additional machine learning models responsive to determining that the given input represents an adversarial example comprises running the one or more additional machine learning models in a fail-safe mode.

13. The apparatus of claim 1 wherein modifying subsequent processing of the given input by the one or more additional machine learning models responsive to determining that the given input represents an adversarial example comprises logging the given input as a suspected adversarial example.

14. The apparatus of claim 1 wherein the first architecture type utilized by the first machine learning model comprises a convolutional neural network with two or more convolution layers and a fully connected layer, and wherein the second architecture type utilized by the second machine learning model comprises an encoder-decoder architecture, an encoder of the encoder-decoder architecture comprising a multi-layer perceptron with one or more fully connected layers.

15. A computer program product comprising a non-transitory processor-readable storage medium having stored therein program code of one or more software programs, wherein the program code when executed by at least one processing device causes the at least one processing device to perform steps of:

utilizing a first machine learning model to determine a classification output for a given input, the classification output indicating probability of the given input belonging to each of a set of two or more classes, the first machine learning model utilizing a first architecture type, the first architecture type having a first set of gradients and associated gradient descending directions;

utilizing a second machine learning model to determine a clustering output for the given input, the clustering output indicating which of a set of two or more clusters that the given input belongs to, the set of two or more clusters corresponding to respective ones of the two or more classes, the second machine learning model utilizing a second architecture type different than the first architecture type, the second architecture type having a second set of gradients and associated gradient descending directions different than the first set of gradients and associated gradient descending directions;

determining whether the given input represents an adversarial example based at least in part on a comparison of the classification output for the given input and the clustering output for the given input; and responsive to determining that the given input represents an adversarial example, modifying subsequent processing of the given input by one or more additional machine learning models.

16. The computer program product of claim 15 wherein the first machine learning model comprises a convolutional neural network model, and wherein the second machine learning model comprises a variational autoencoder model.

17. The computer program product of claim 15 wherein the first architecture type utilized by the first machine learning model comprises a convolutional neural network with two or more convolution layers and a fully connected layer, and wherein the second architecture type utilized by the second machine learning model comprises an encoder-decoder architecture, an encoder of the encoder-decoder architecture comprising a multi-layer perceptron with one or more fully connected layers.

18. A method comprising:

utilizing a first machine learning model to determine a classification output for a given input, the classification output indicating probability of the given input belonging to each of a set of two or more classes, the first machine learning model utilizing a first architecture type, the first architecture type having a first set of gradients and associated gradient descending directions;

utilizing a second machine learning model to determine a clustering output for the given input, the clustering output indicating which of a set of two or more clusters that the given input belongs to, the set of two or more clusters corresponding to respective ones of the two or more classes, the second machine learning model utilizing a second architecture type different than the first architecture type, the second architecture type having a second set of gradients and associated gradient descending directions different than the first set of gradients and associated gradient descending directions;

determining whether the given input represents an adversarial example based at least in part on a comparison of the classification output for the given input and the clustering output for the given input; and responsive to determining that the given input represents an adversarial example, modifying subsequent processing of the given input by one or more additional machine learning models;

wherein the method is performed by at least one processing device comprising a processor coupled to a memory.

19. The method of claim 18 wherein the first machine learning model comprises a convolutional neural network model, and wherein the second machine learning model comprises a variational autoencoder model.

20. The method of claim 18 wherein the first architecture type utilized by the first machine learning model comprises a convolutional neural network with two or more convolution layers and a fully connected layer, and wherein the second architecture type utilized by the second machine learning model comprises an encoder-decoder architecture, an encoder of the encoder-decoder architecture comprising a multi-layer perceptron with one or more fully connected layers.

\* \* \* \* \*